United States Patent
Sevindik

(10) Patent No.: US 11,646,997 B2
(45) Date of Patent: May 9, 2023

(54) DATA TRANSMISSION METHOD WITH SELECTIVE LATENCY REDUCTION

(71) Applicant: Charter Communications Operating, LLC, St. Louis, MO (US)

(72) Inventor: Volkan Sevindik, Parker, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 218 days.

(21) Appl. No.: 17/206,975

(22) Filed: Mar. 19, 2021

(65) Prior Publication Data
US 2022/0303243 A1    Sep. 22, 2022

(51) Int. Cl.
*H04L 9/40* (2022.01)
*H04W 72/12* (2009.01)
*H04W 72/1273* (2023.01)

(52) U.S. Cl.
CPC ........ *H04L 63/0236* (2013.01); *H04L 63/029* (2013.01); *H04L 63/0435* (2013.01); *H04L 63/166* (2013.01); *H04W 72/1273* (2013.01); *H04W 72/1289* (2013.01)

(58) Field of Classification Search
CPC ............... H04L 63/0236; H04L 63/029; H04L 63/0435; H04L 63/166; H04W 72/1273; H04W 72/1289
See application file for complete search history.

(56) References Cited

U.S. PATENT DOCUMENTS

| | | | | |
|---|---|---|---|---|
| 6,708,218 B1* | 3/2004 | Ellington, Jr. | ........ | H04L 63/164 709/239 |
| 7,398,386 B2* | 7/2008 | Kessler | ................. | H04L 63/045 713/150 |
| 7,657,933 B2* | 2/2010 | Hussain | .................. | G06F 21/72 713/153 |
| 9,473,298 B2* | 10/2016 | Wante | .................... | H04W 12/02 |
| 9,820,182 B2* | 11/2017 | Welin | .................... | H04L 63/164 |
| 2002/0188871 A1* | 12/2002 | Noehring | ............ | H04L 63/0485 726/13 |
| 2004/0205331 A1* | 10/2004 | Hussain | .................. | G06F 21/72 713/153 |
| 2004/0205332 A1* | 10/2004 | Bouchard | ............. | H04L 63/164 713/153 |

(Continued)

*Primary Examiner* — Techane Gergiso
(74) *Attorney, Agent, or Firm* — Straub & Straub; Michael P. Straub; Stephen T. Straub

(57) ABSTRACT

A base station identifies received backhaul traffic including IP packets based on whether or not the reception was via a secure tunnel, e.g., an IPsec tunnel. Recovered data, e.g., an IP packet from an IPsec tunnel, is associated with an IPsec identifier having a value indicating that the packet came from an IPsec tunnel. Data, e.g., recovered IP packets, associated with an identifier indicating receipt via an IPsec tunnel are stored in a first transmission buffer, e.g., a high priority transmission buffer, while other recovered IP packets which were not received via an IPsec tunnel are stored in a second transmission buffer corresponding to a lower, e.g., normal, transmission priority. A downlink transmission scheduler, e.g. an MAC or frame scheduler, schedules transmission of frames includes IP packet data from both buffers, with data in the first buffer being given higher priority to reduce latency with regard to the IPsec traffic.

20 Claims, 20 Drawing Sheets

(56) References Cited

U.S. PATENT DOCUMENTS

| | | | | |
|---|---|---|---|---|
| 2004/0205336 | A1* | 10/2004 | Kessler | H04L 63/164 713/160 |
| 2007/0071007 | A1* | 3/2007 | Ross | H04L 63/0485 370/392 |
| 2008/0126559 | A1* | 5/2008 | Elzur | H04L 63/0464 709/232 |
| 2016/0135074 | A1* | 5/2016 | Welin | H04W 28/10 370/235 |
| 2021/0136036 | A1* | 5/2021 | Pullela | H04L 63/20 |

* cited by examiner

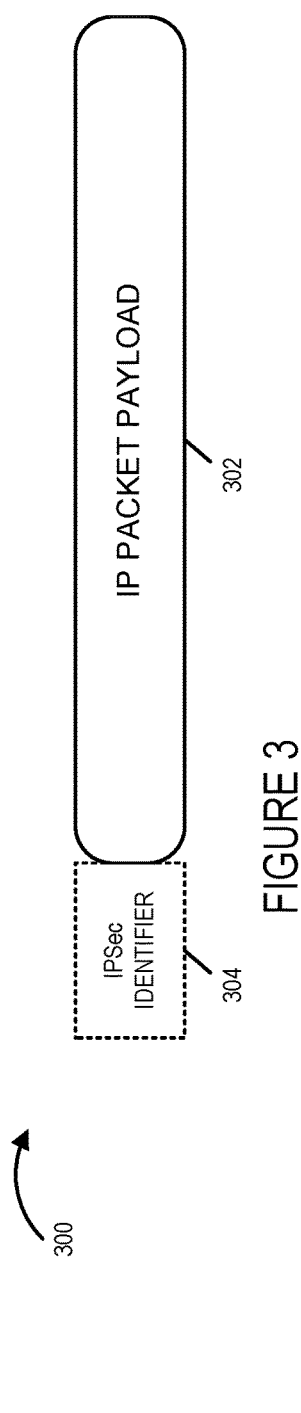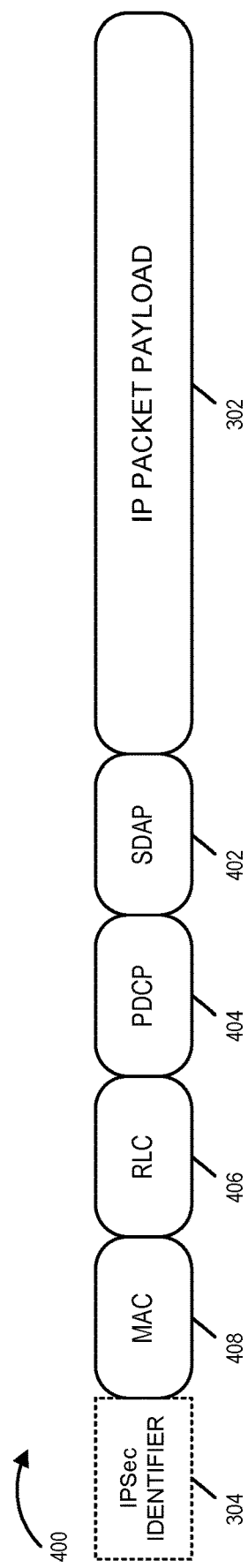

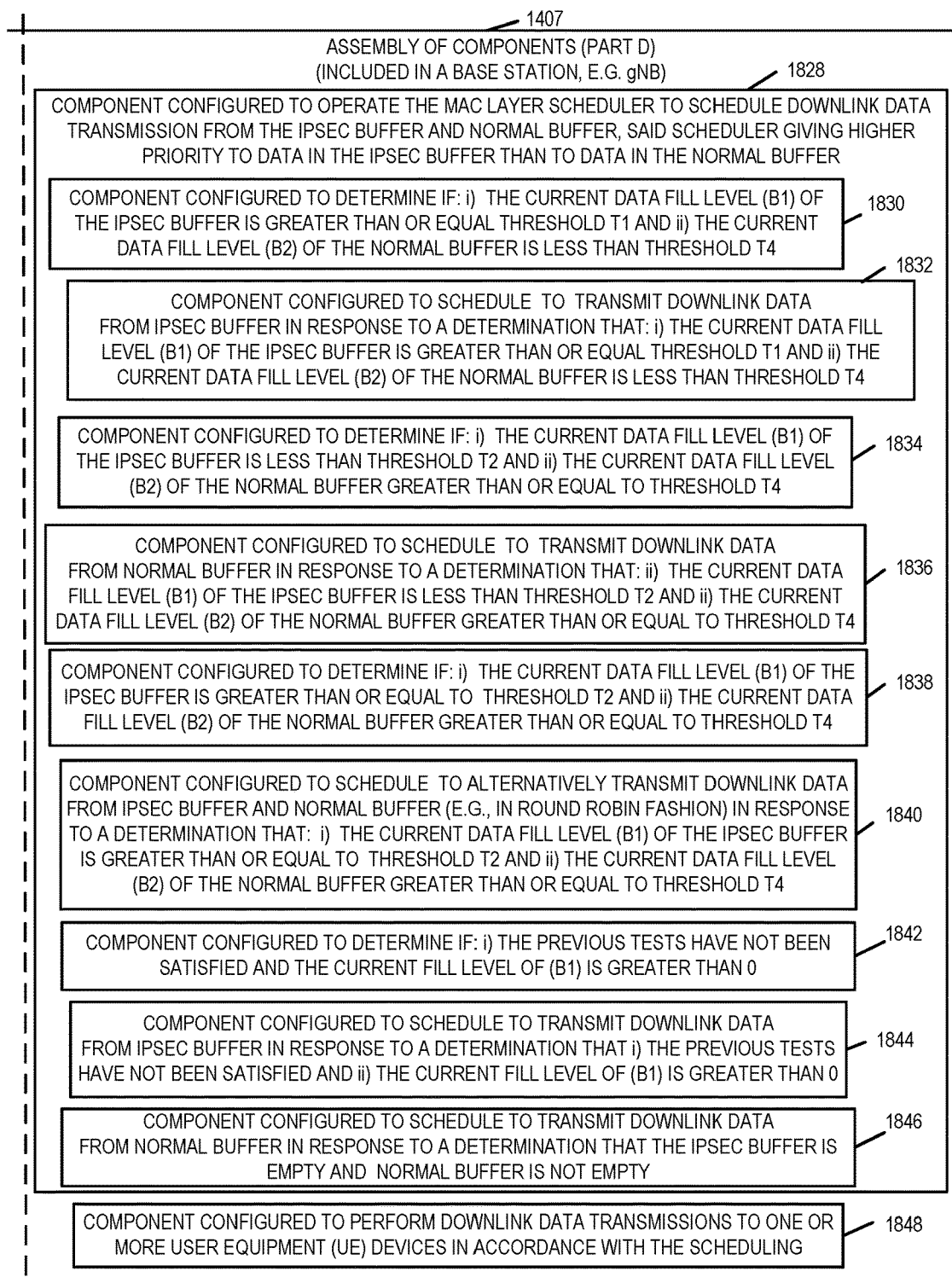

DATA TRANSMISSION METHOD WITH SELECTIVE LATENCY REDUCTION

FIELD

The present invention relates to wireless communications systems, and more particularly, to methods and apparatus for supporting efficient communications in systems using a secure tunnel, e.g., an Internet Protocol Security (IPsec) tunnel, for some backhaul communications, e.g., for IP packets carrying data intended for downlink transmission.

BACKGROUND

In computing, Internet Protocol Security (IPsec) is a secure network protocol suite that authenticates and encrypts the packets of data to provide secure encrypted communication between two computers over an Internet Protocol network. It is used in virtual private networks (VPNs).

IPsec includes protocols for establishing mutual authentication between agents at the beginning of a session and negotiation of cryptographic keys to use during the session. IPsec can protect data flows between a pair of hosts (host-to-host), between a pair of security gateways (network-to-network), or between a security gateway and a host (network-to-host). IPsec uses cryptographic security services to protect communications over Internet Protocol (IP) networks. It supports network-level peer authentication, data-origin authentication, data integrity, data confidentiality (encryption), and replay protection.

In a Multiple System Operator (MSO) network, backhauls that are used sometimes belong to 3rd party cable operators. In such a case the MSO normally uses secure IP communications (IPsec) between a 5G gNB and the MSO's data center. Adding IPsec increases the data transmission latency, and this is an issue for the 5G network since one of the promises of 5G networks is to reduce the data transmission latency.

While the security provided by the encryption associated with an IP sec tunnel can be desirable, the latency introduced by the use of the tunnel, e.g., due at least in part to encryption/decryption of tunneled data can be undesirable. It would be desirable if a base station, e.g., gNB receiving packet data for downlink transmission could somehow compensate for delays introduce by an IP sec tunnel. Unfortunately, in existing system once IP packet data is extracted from an IP sec tunnel, there is no way to distinguish it from data received via other communications links and/or to compensate for the delays introduced by using an IP sec tunnel.

In view of the above, it should be appreciated that there is a need for methods and apparatus for identifying data, e.g., IP packets which were communicated via an IP sec tunnel, after they have left the tunnel and/or methods which can be used to compensate for delays introduced by communicating IP packets through a secure tunnel, e.g., such as an IP sec tunnel.

SUMMARY

In various embodiments an identifier is associated with data received via an IP sec tunnel and/or steps are taken to compensate for communications delays associated with communicating data via an IP sec tunnel. In some embodiments, after IP packet data is recovered from a secure communications tunnel, e.g., an IP sec tunnel, an identifier is associated with the data. In this way data, e.g., IP packets and/or IP packet payloads that were received via a secure tunnel can be identified at various stages of processing even though IP sec headers and/or other information have been removed. Packet data, e.g., packets and/or IP packet payloads with which an IP sec identifier is associated in some embodiments are given priority in terms of processing and/or transmission in some embodiments as compared to other data which was not communicated via a secure, e.g., IP sec, tunnel. In this way by giving priority to IP sec communication data for processing and/or transmission relative to other data which was not transmitted via an IP sec tunnel, the amount of processing and/or delay in transmission at a base station is less for data received in an IP sec tunnel as compared to data that is received via an unsecured communications channel, e.g., via a channel of communications path which does not include or traverse an IP sec tunnel. Thus an identifier with a value, e.g., 1, indicating a packet or data was received via an IP sec tunnel is associated, e.g., added, at a base station in some embodiments to a packet or packet payload, e.g., as a header. This identifier is used to identify IP sec received data and giving scheduling and/or processing priority over data which was received, e.g., at a base station, via a communications link which did not include an IP sec tunnel. The identifier can facilitate MAC level processing and/or scheduling of data transmissions with the IP sec identifier being stripped from the data prior to transmission to a user device, e.g., by a base station. In some embodiments packets which are received at a base station via a communications path which does not include an IP sec tunnel are associated with an identifier value indicating a non-IP sec tunneled packet. In such a case the bit used as an IP sec identifier may be and sometime is set to a value, e.g., 0, used to identify packets or packet data which was not received via an IP sec tunnel. The explicit identification of non-IP sec tunneled packets is optional and packets lacking an associated IP sec identifier set to a value indicating IP sec tunneled data are presumed to be non-IP sec tunneled packets and given lower priority at the base station in some embodiments.

The base station in some embodiments maintains different downlink transmission queues with IP sec tunneled data being stored in a high priority queue and non-IP sec tunneled data being stored in a lower priority downlink transmission queue. A downlink transmission schedule in the base station gives priority to the data in the high priority queue and ensures that on average the transmission latency of data in the high priority queue is lower than the average transmission latency in the lower priority downlink transmission queue in which the non-IP sec data is stored for transmission. While the scheduled transmission is of IP packet data, the data can be and is fragmented and transmitted in MAC layer frames over the air link used for downlink transmissions.

By identifying data that was received at a base station in an IP sec tunnel as IP sec data the base station can give priority to such data and thereby partially compensate for the delays associated with the use of the IP sec tunnel. As a result of the IP sec tunneled data prioritization at the base station the traffic received via a communications path that did not include an IP sec tunnel may be delayed slightly but the overall transmission time may still be less than the IP sec tunneled traffic since such non-IP sec packets were not subject to encryption/decryption and/or other IP sec related processing delay.

Thus, in various embodiments, a base station can at least partially compensate for IP sec tunneling delays via traffic prioritization.

A base station receives some IP packet data which is communicated in encrypted form to the base station via an IPsec tunnel and receives other IP packet data which is communicated to the base station without using an IPsec tunnel. The base station associates an IPsec identifier, having a value, e.g., 1, indicating that the IPsec data was received via an IPsec tunnel with the data which was received via an IPsec tunnel. In some embodiments, the base station associates an IPsec identifier, having a value, e.g., 0, indicating that the IPsec data was not received via an IPsec tunnel with the data which was not received via an IPsec tunnel. The base station stores the IP packet data corresponding to the IPsec identifier indicating reception via an IPsec tunnel in a first downlink transmission data buffer and stores the other IP packet data, which was received without use of an IPsec tunnel in a second downlink transmission buffer, said storage being based on the value of the associated IPsec identifier. A scheduler, e.g., a MAC layer scheduler, which transmits frames of data including IP packets and/or packet portions gives higher priority to data in the first transmission buffer than to data in the second transmission buffer, in accordance with a set of rules. IP packet data communicated over backhaul via IPsec tunnels has higher latency than normal IP packet data communicated over backhaul with an IPsec tunnel. The higher priority given to the IPsec traffic over normal traffic tends to reduce latency for the IPsec traffic as compared to the latency that would be encountered if all received data were given the same processing/transmission priority at the base station.

An exemplary method of operating a base station, e.g., a gNB, in accordance with some embodiments, comprises: receiving, at the base station, encrypted IP packet data via an IPsec tunnel with a security server of a communications service provider; decrypting the encrypted IP packet data received via the IPsec tunnel to recover first IP packets; associating an IPsec identifier with the first IP packets, said IPsec identifier being set to a value indicating that the first IP packets were received via an IPsec tunnel; receiving, at the base station, additional data including additional IP packets via a communications link that does not use an IPsec tunnel; identifying first packets based on the value of the IPsec identifier associated with the first IP packets; storing the identified first packets in a first downlink transmission queue; and storing packets which were not received via an IPsec tunnel in a second downlink transmission queue, said additional IP packets being stored in said second downlink transmission queue.

While various features discussed in the summary are used in some embodiments it should be appreciated that not all features are required or necessary for all embodiments and the mention of features in the summary should in no way be interpreted as implying that the feature is necessary or critical for all embodiments.

Numerous aspects, features, and variations on the above described methods and apparatus are discussed in the detailed description which follows.

BRIEF DESCRIPTION OF THE FIGURES

FIG. 3 illustrates an exemplary IP packet payload and a corresponding novel IPsec Identifier, which is associated with the received recovered IP packet payload, e.g., in the IP layer processing, in accordance with an exemplary embodiment.

FIG. 4 includes an exemplary IP packet payload, SDAP header, PDCP header, RLC header, MAC header, and appended novel IPSec Identifier, e.g., which is processed in the MAC layer processing, in accordance with an exemplary embodiment.

FIG. 14D is a fourth part of an exemplary assembly of components which may be included in a base station in accordance with an exemplary embodiment.

FIG. 14 comprises the combination of FIG. 14A, FIG. 14B, FIG. 14C and FIG. 14D.

DETAILED DESCRIPTION

Figure 1:
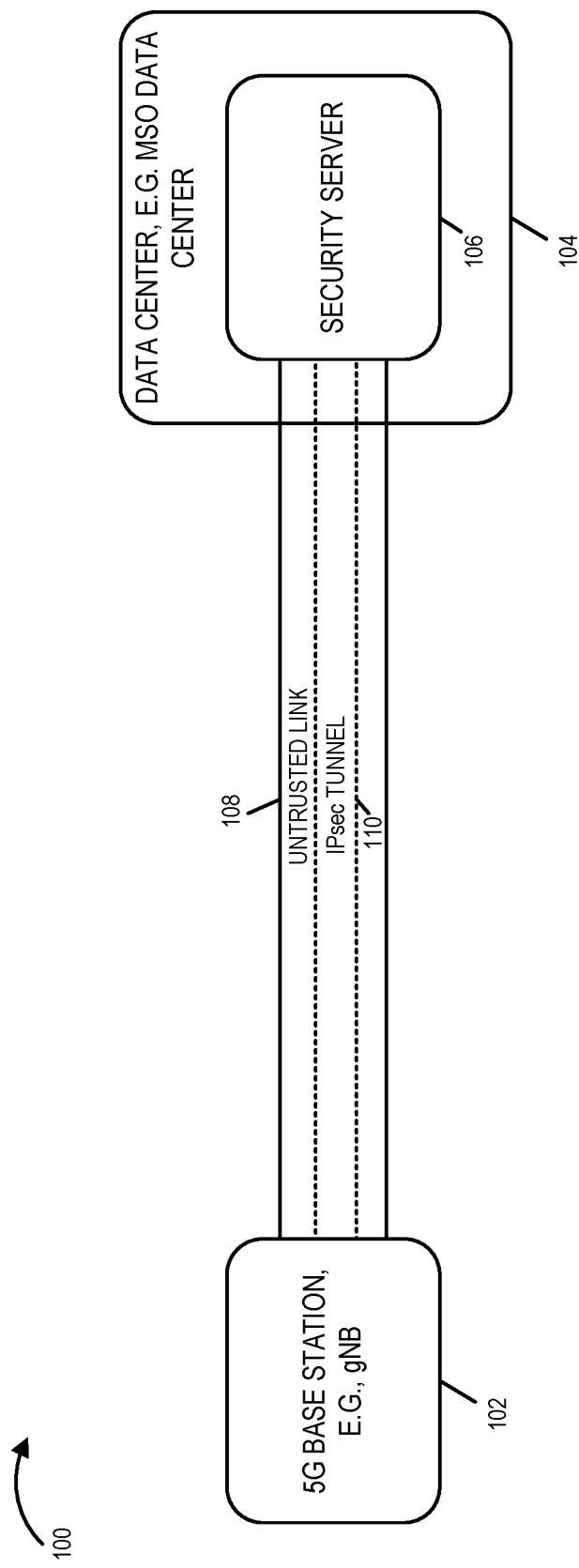
FIG. 1 is a drawing of a base station coupled to a data center including a security server via an untrusted communications link in which an IPsec tunnel is used to securely communicate IP packets.

FIG. 1 is a drawing 100 which includes a 5G base station 102, e.g., a gNB, coupled to a data center 104, e.g., a Multiple System Operator (MSO) data center, including a security server 106. There are communications over untrusted communications link 108. The 5G base station 102, e.g., a gNB, is deployed with unsecure backhaul connection 108 with data center 104, e.g., a MSO data center. An IPsec tunnel 110 is used to securely communicate IP packets from the data center 104 to the base station 102, e.g., gNB, over the untrusted link 108.

Figure 2:
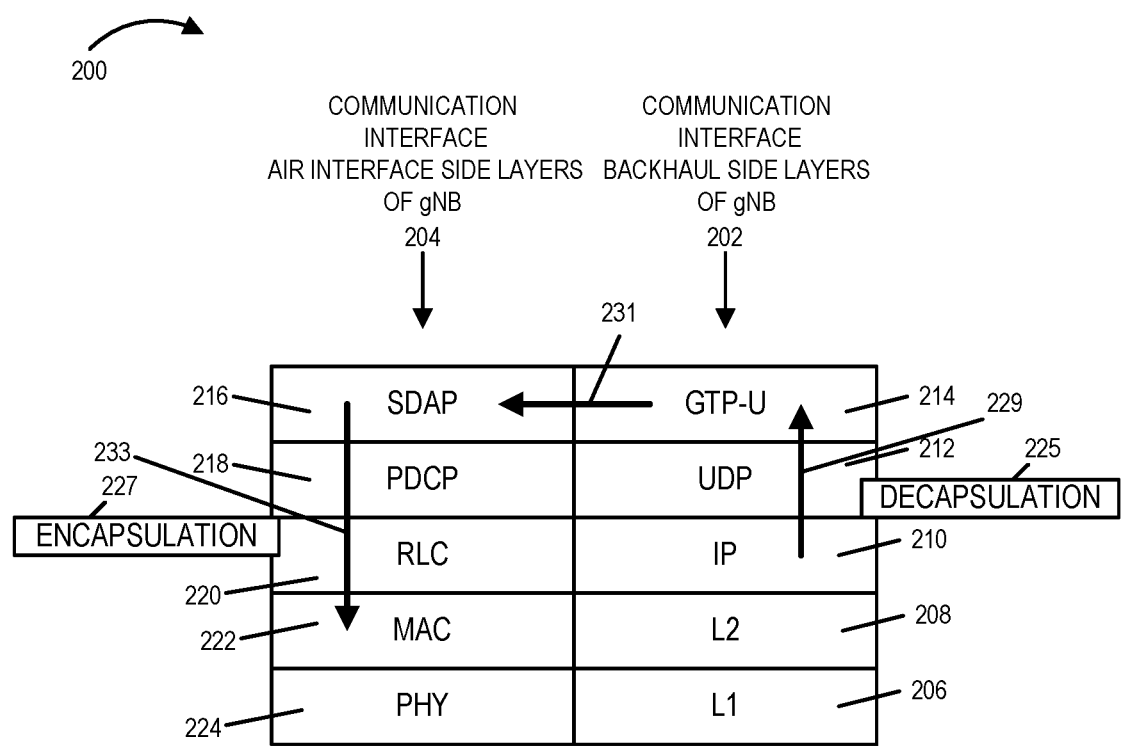
FIG. 2 is a drawing which illustrates protocol layers of a base station and further illustrates a novel cross-layer communication between the IP layer on the backhaul side and the MAC layer on the air interface side of a novel IPsec identifier in accordance with an exemplary embodiment.

FIG. 2 is a drawing 200 which shows protocol layers of the exemplary base station 102, e.g., the gNB, of FIG. 1. The communications interface of the backhaul side 202 the base station 102, e.g., gNB, includes the following protocol layers: Layer 1 (L1) 206, Layer 2 (L2) 208, Internet Protocol (IP) 210, User Datagram Protocol (UDP) 212 and GPRS Tunneling Protocol—User Plane (GTP-U) 214. The communications interface of the air interface side 204 of the base station 102, e.g., gNB, includes the following protocol layers: Service Data Adaption Protocol (SDAP) 216, Packet Data Convergence Protocol (PDCP) 218, Radio Link Control (RLC) 220, Medium Access Control (MAC) 222 and Physical (PHY) 224. Decapsulation 225 is performed on the backhaul side 202, while encapsulation 227 is performed on the air interface side 204.

The base station 102, gNB, has L1, L2 and IP layers (206, 208, 210) on the communications interface on the backhaul side 202. The base station 102, gNB, has PHY, MAC, RLC, and PDCP layers (224, 222, 220, 218) on the air interface side 204. IP layers including IP layer 210 of the base station 102 on the backhaul side 202 manage the IPsec communication. A novel cross-layer communication between the IP layer on the backhaul side and the MAC layer on the air interface side (as indicated by arrows 229, 231, 233), which is a feature of various embodiments of the present invention, is introduced and used.

In various embodiments, the IP layer 210 has two alternative novel markings which can be, and sometimes are, associated with a received IP packet payload, a first marking for IPsec traffic (e.g., IP traffic which was received via an IPsec tunnel) and a second marking for normal IP traffic (e.g., IP traffic which was received and which was not communicated to the base station using an IPsec tunnel). In some embodiments, a new mark label is called "IPSec Identifier" and it can have a value of '0' or '1', e.g., the IPSec Identifier is set=1 when the received IP packet payload was communicated over the backhaul via an IPsec tunnel, and the IPSec Identifier is set=0, when the received IP packet payload was normal traffic that was not communicated via an IPsec tunnel over the backhaul. In various embodiments, the IPsec identifier is set to the appropriate value (1 or 0) in the IP layer 210 processing, and associated with the received IP packet payload.

FIG. 3 includes drawing 300 which illustrates an exemplary IP packet payload 302 and a corresponding IPsec Identifier 304 (with a value of 0 or 1), which is associated with the received recovered IP packet payload 302.

The IPSec identifier 304 is appended after the header of each protocol layer is added. FIG. 4 includes drawing 400 which illustrates the exemplary IP packet payload 302, SDAP header 402, PDCP header 404, RLC header 406, MAC header 408, and appended novel IPSec Identifier 304 (with a value of 0 or 1).

Figure 5:
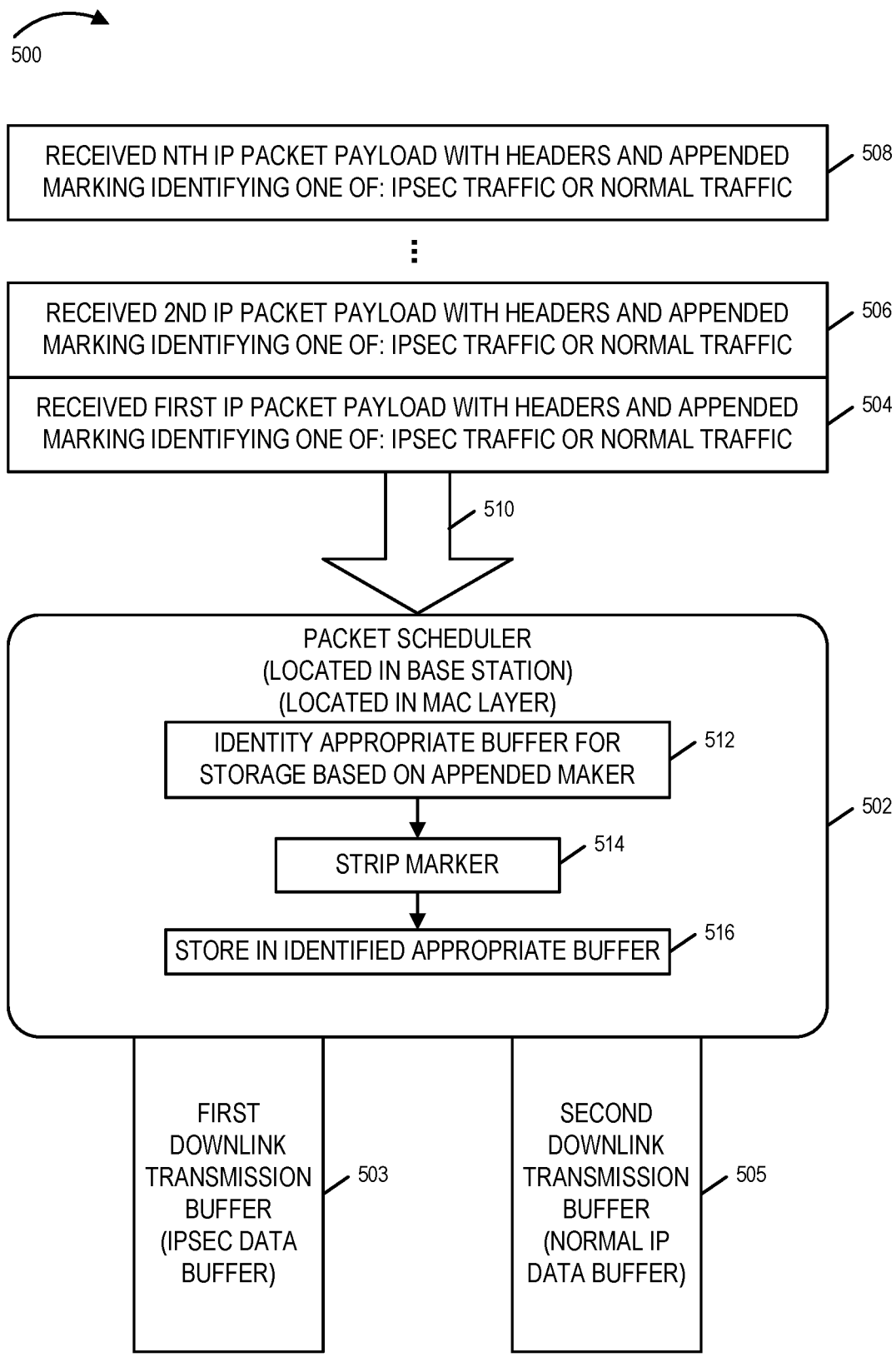
FIG. 5 is a drawing which illustrates an exemplary packet scheduler, located in the base station MAC layer, a first downlink transmission buffer, sometimes referred to as an IPsec data buffer or queue, and a second downlink transmission buffer, sometimes referred to as a normal IP data buffer or queue, and further illustrates processing of IP packet data and storage of IP packet data, based on associated IPsec Identifier values, in accordance with an exemplary embodiment.

The scheduler, e.g., a MAC layer scheduler, will check the packets that are sent from the upper layer and create two different downlink (DL) buffers, a first DL buffer for IPSec traffic and a second DL buffer for normal IP traffic. FIG. 5 includes drawing 500 which illustrates an exemplary packet scheduler 502, located in the base station MAC layer, a first downlink transmission buffer 503, sometimes referred to as an IPsec data buffer or queue, and a second downlink transmission buffer 505, sometimes referred to as a normal IP data buffer or queue. The scheduler 502 receives a sequence of IP packet payloads with headers and an appended markings (received first IP packet payload with headers and an appended marking (IPsec Identifier value) indicating one of: IPsec traffic or normal IP traffic 504, received second IP packet payload with headers and an appended marking (IPsec Identifier value) indicating one of: IPsec traffic or normal IP traffic 506, . . . , received Nth IP packet payload with headers and an appended marking (IPsec Identifier value) indicating one of: IPsec traffic or normal IP traffic 508). Each received data set (504, 506, 508) is processed by the scheduler 502, e.g. in succession. In step 512 the scheduler 502 identifies the appropriate buffer for storage based on the appended maker, e.g., if the IPsec identifier=1, then the data is to be stored in the first downlink transmission buffer (IPsec data buffer) 503; but if the IPsec identifier=0, then the data is to be stored in the second downlink transmission buffer (normal IP data buffer) 505. Operation proceeds from step 512 to step 514. In step 514 the scheduler 502 striper the marker (previously appended IPsec Identifier value) from the IP packet payload with headers, and in step 514 the scheduler 502 stores the IP packet payload with headers in the appropriate downlink transmission buffer in accordance with the identification of step 512. For example, consider that the IPsec identifier=1 in received information sets 504 and 508, while the IPsec identifier=0 in received information set 506, then the first IP packet payload with its headers would be stored in first downlink transmission buffer (IPsec data buffer) 503; the second IP packet payload with its headers would be stored in second downlink transmission buffer (IPsec data buffer) 505; and the Nth IP packet payload with its headers would be stored in first downlink transmission buffer (IPsec data buffer) 503.

The scheduler 502, e.g., a MAC packet scheduler, is configured to make scheduling decisions based on the current amount of data in the first downlink transmission buffer (IPsec data buffer) 503 and the second downlink transmission buffer (normal IP data buffer) 505.

In some embodiments, the packet scheduler 502 will send the packets from the IPSec traffic buffer 503 first, provided the amount of data in the normal traffic buffer 505 stays under a certain threshold. In some embodiments, when the amount of data in the IPsec traffic buffer 503 goes below a certain threshold, the scheduler 502 will then send packets from the normal traffic data buffer 505.

Figure 6:
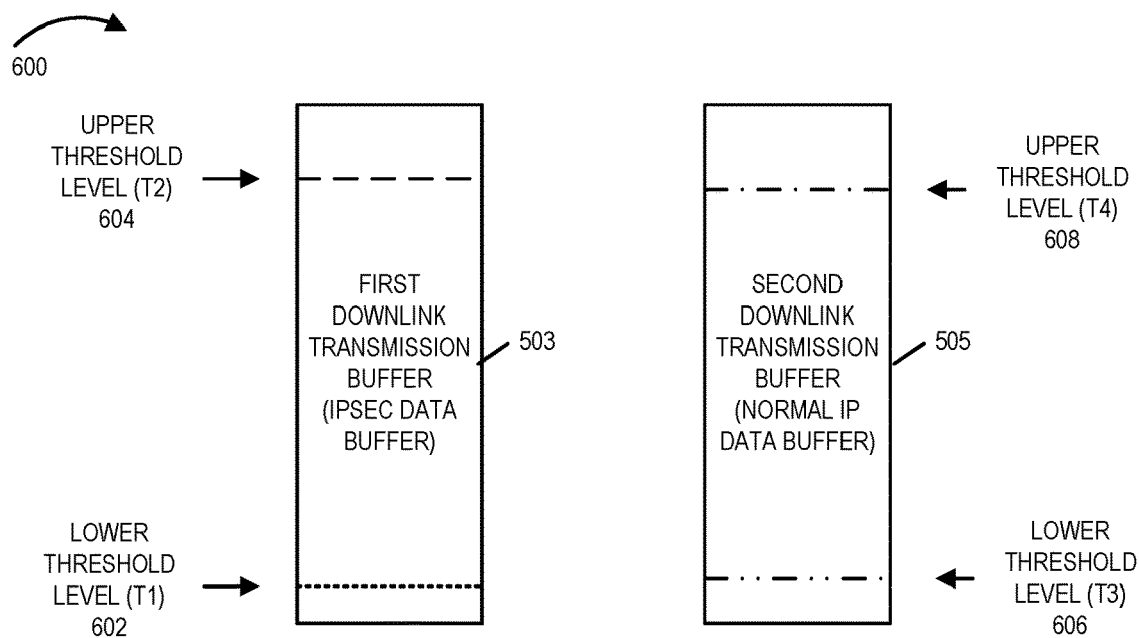
FIG. 6 is a drawing illustrating the two exemplary downlink transmission buffers (first downlink transmission buffer (IPsec traffic data buffer), second downlink transmission buffer (normal IP traffic data buffer) and exemplary threshold limits for each buffer in accordance with an exemplary embodiment.

FIG. 6 is a drawing 600 illustrating the two exemplary downlink transmission buffers (first downlink transmission buffer 503, second downlink transmission buffer 505) and exemplary threshold limits for each buffer in accordance with an exemplary embodiment. First downlink transmission buffer (IP sec data buffer) 503 has: i) a lower threshold level (T1) 602, as represented by a dotted line and ii) an upper threshold level (T2) 604, as represented by a dashed line. Second downlink transmission buffer (normal IP data buffer) 505 has: i) a lower threshold level (T3) 606, as represented by a double dotted—dashed line and ii) an upper threshold level (T4) 606, as represented by a dot-dash line.

Figure 7:
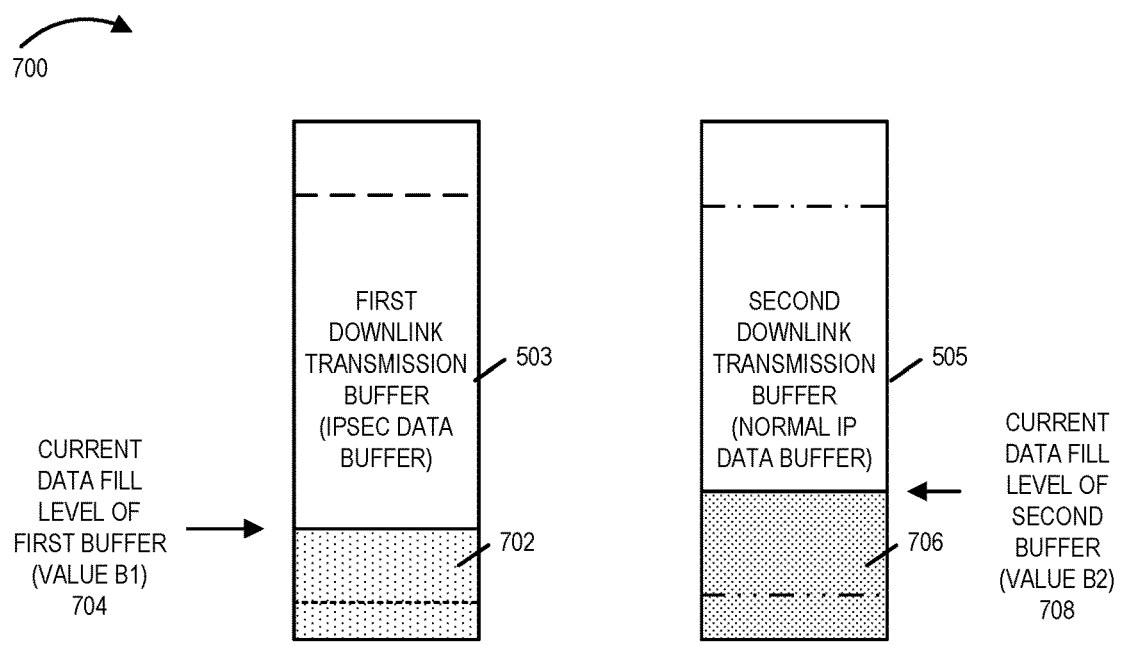
FIG. 7 is a drawing illustrating the two exemplary downlink transmission buffers with exemplary threshold limits of FIG. 6 and further includes exemplary current data fill levels in accordance with an exemplary embodiment.

FIG. 7 is a drawing 700 illustrating the two exemplary downlink transmission buffers (first downlink transmission buffer 503, second downlink transmission buffer 505) with threshold limits of FIG. 6 and further includes exemplary current data fill levels in accordance with an exemplary embodiment. In FIG. 7, the first downlink transmission buffer (IPsec data buffer) 503 is currently filled with data 702, as indicated by dotted shading, and has a current data fill level (value B1) 704. In FIG. 7, the second downlink transmission buffer (normal IP data buffer) 505 is currently filled with data 706, as indicated by tightly spaced dotted shading, and has a current data fill level (value B2) 708.

Figure 8:
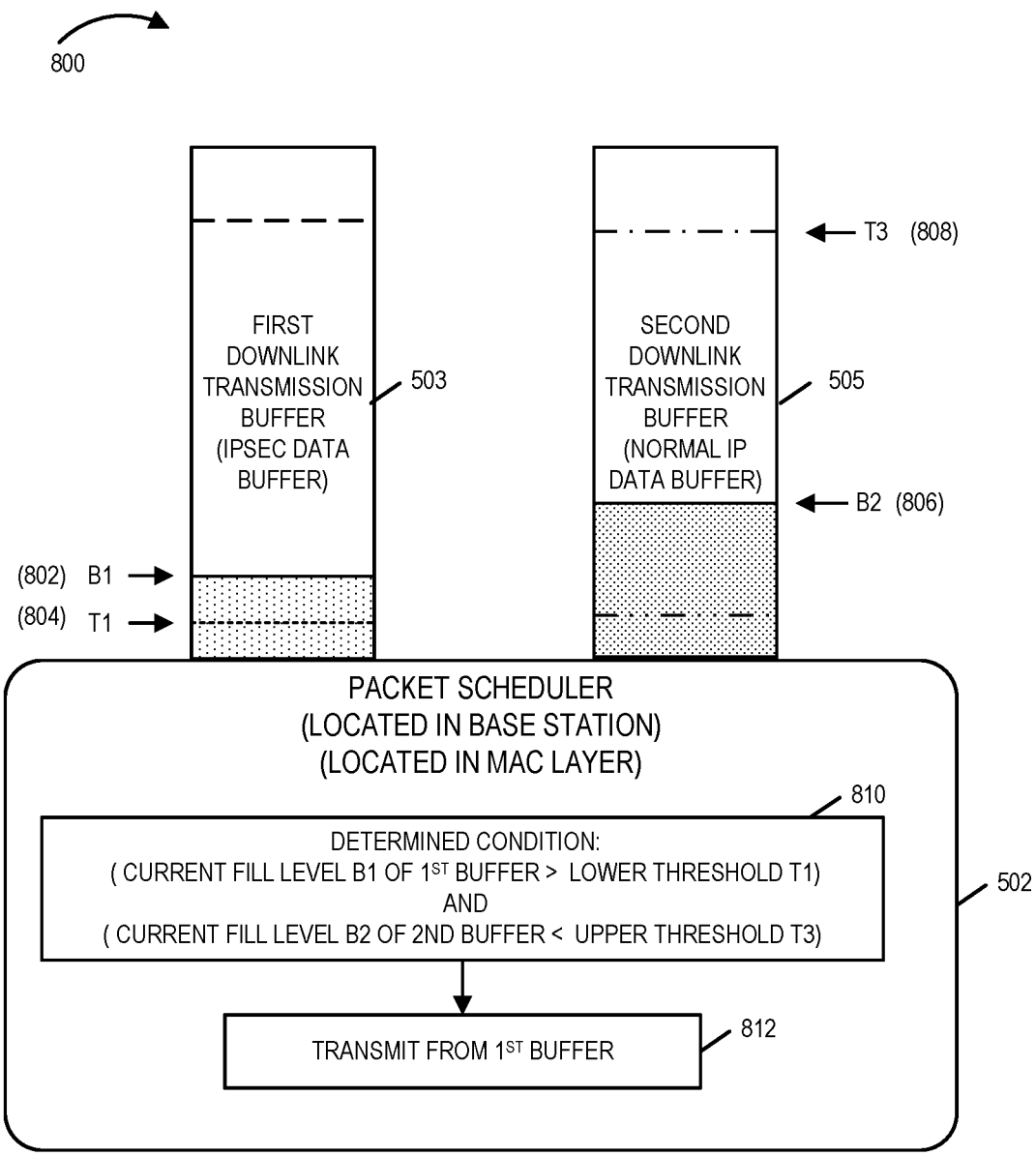
FIG. 8 is a drawing used to illustrate an example in which a scheduler makes a decision to schedule transmission from the first downlink transmission buffer (IP sec data buffer), in response to a determination the current fill level of the first downlink transmission buffer is above its lower threshold, and the current fill level of the second downlink transmission buffer (normal IP data buffer) is below its upper threshold.

FIG. 8 is a drawing 800 used to illustrate an example in which the scheduler 502 makes a decision to schedule transmission from the first downlink transmission buffer (IP sec data buffer) 503, in response to a determination the current fill level of the first downlink transmission buffer is above its lower threshold, and the current fill level of the second downlink transmission buffer is below its upper threshold. In the example of FIG. 8, the fill level B1 802 of the first downlink transmission buffer (IPsec buffer) 503 is above the lower threshold (T1) 804; and the fill level B2 806 of the second downlink transmission buffer (normal IP data buffer) 505 is below the upper threshold (T3) 808. In step 810 the packet scheduler 502 evaluates current levels of fill and determines that the condition: (current fill level B1 of 1st buffer>lower threshold T1) and (current fill level B2 of 2nd buffer<upper threshold T3) exists. In response to the determination of step 810 the scheduler 502 in step 812 schedules downlink transmission from the 1st buffer and controls the base station to transmit packets from the first buffer in accordance with scheduling decision.

Figure 9:
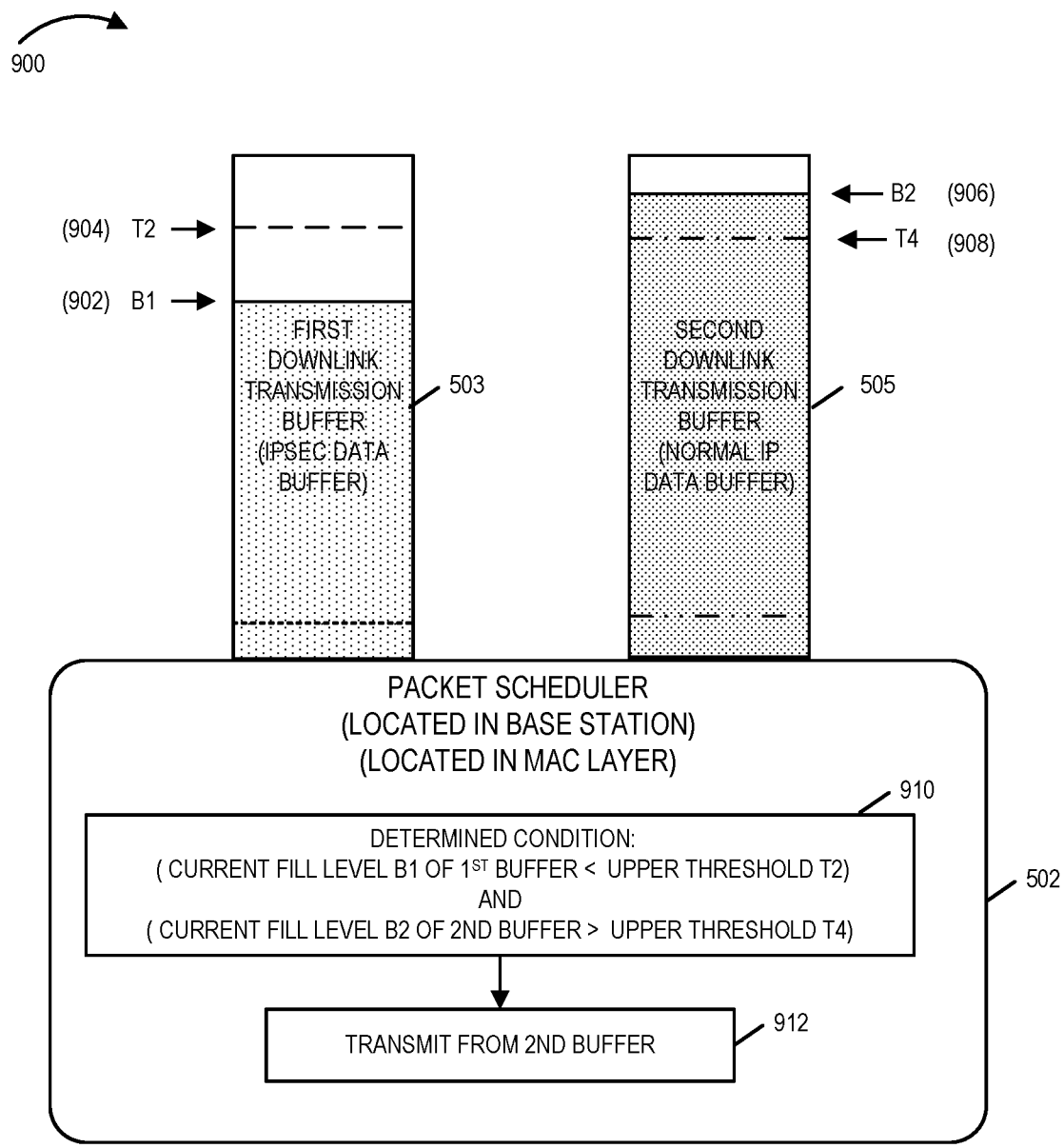
FIG. 9 is a drawing used to illustrate an example in which a scheduler makes a decision to schedule transmission from the second downlink transmission buffer (normal IP data buffer), in response to a determination the current fill level of the first downlink transmission buffer (IPsec data buffer) is below its upper threshold, and the current fill level of the second downlink transmission buffer is above its upper threshold.

FIG. 9 is a drawing 900 used to illustrate an example in which the scheduler 502 makes a decision to schedule transmission from the second downlink transmission buffer (normal IP data buffer) 505, in response to a determination the current fill level of the first downlink transmission buffer is below its upper threshold, and the current fill level of the second downlink transmission buffer is above its upper threshold. In the example of FIG. 9, the fill level B1 902 of the first downlink transmission buffer (IPsec buffer) 503 is above the upper threshold (T2) 904; and the fill level B2 906 of the second downlink transmission buffer (normal IP data buffer) 505 is below the upper threshold (T4) 908. In step 910 the packet scheduler 502 evaluates current levels of fill and determines that the condition: (current fill level B1 of 1st buffer<upper threshold T2) and (current fill level B2 of 2nd buffer>upper threshold T4) exists. In response to the determination of step 910 the scheduler 502 in step 912 schedules downlink transmission from the 2nd buffer and controls the base station to transmit packets from the second buffer in accordance with scheduling decision.

Figure 10:
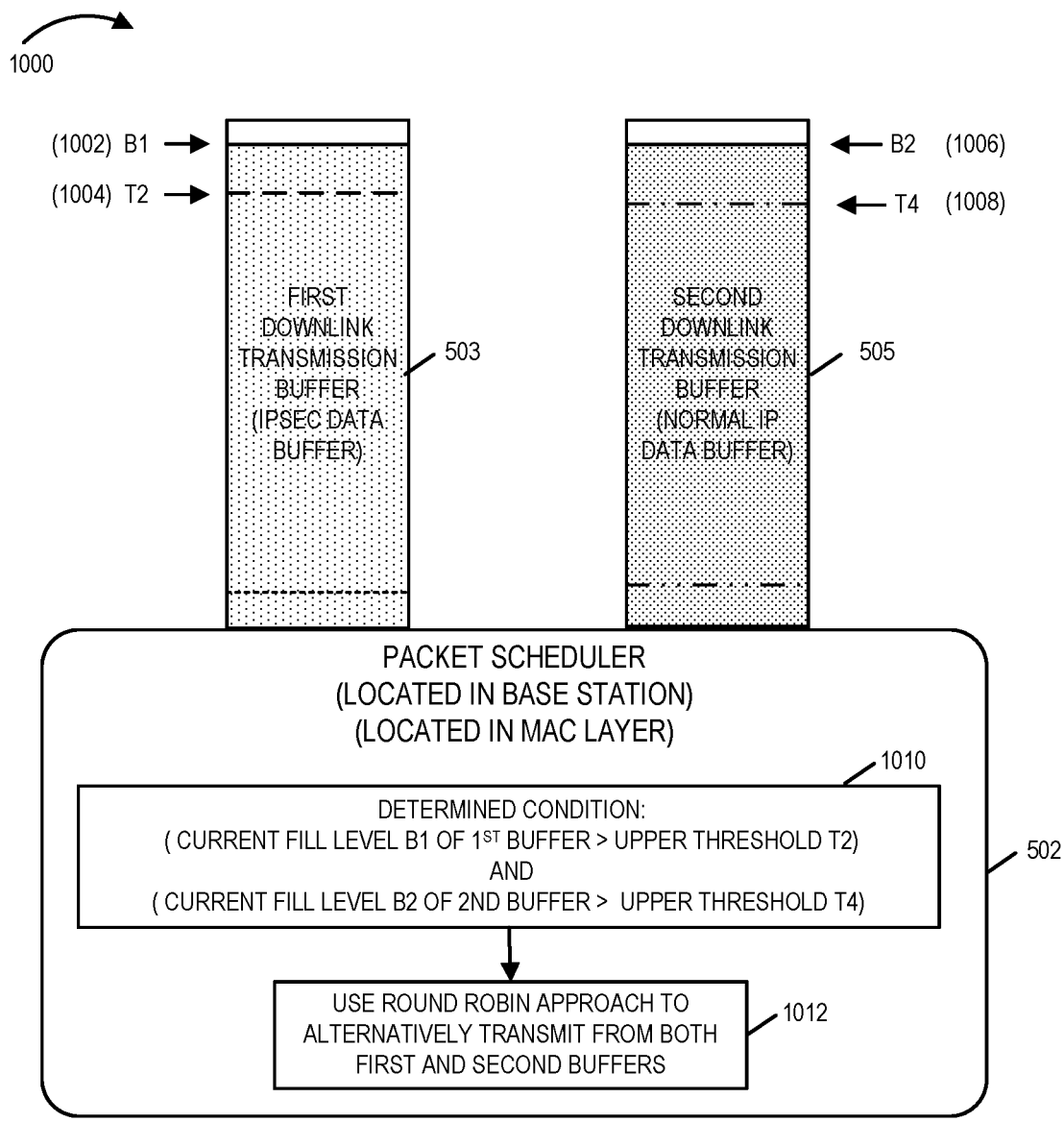
FIG. 10 is a drawing used to illustrate an example in which a scheduler makes a decision to schedule transmission from both the first downlink transmission buffer (IPsec buffer) and second downlink transmission buffer (normal IP data buffer), e.g., in a round robin approach, in response to a determination the current fill level of the first downlink transmission buffer is above its upper threshold, and the current fill level of the second downlink transmission buffer is also above its upper threshold.

FIG. 10 is a drawing 1000 used to illustrate an example in which the scheduler 502 makes a decision to schedule transmission from both the first downlink transmission buffer (IPsec buffer) 503 and second downlink transmission buffer (normal IP data buffer) 505, e.g., in a round robin approach, in response to a determination the current fill level of the first downlink transmission buffer is above its upper threshold, and the current fill level of the second downlink transmission buffer is also above its upper threshold. In the example of FIG. 10, the fill level B1 1002 of the first downlink transmission buffer (IPsec buffer) 503 is above the upper threshold (T2) 1004; and the fill level B2 1006 of the second downlink transmission buffer (normal IP data buffer) 505 is below the upper threshold (T4) 1008. In step 1010 the packet scheduler 502 evaluates current levels of fill and determines that the condition: (current fill level B1 of 1st buffer>upper threshold T2) and (current fill level B2 of 2nd buffer>upper threshold T4) exists. In response to the determination of step 1010 the scheduler 502 in step 1012 schedules downlink transmissions from the 1st and 2nd buffers alternatively using a round robin approach and controls the base station to transmit packets from the first and second buffers in accordance with scheduling decision.

The example of FIG. 8 illustrates an example in which the data in the first downlink transmission queue (IPsec data buffer) gets prioritized for transmission over the data in the second downlink transmission queue under most conditions. The example of FIG. 9 illustrates an example in which the data in the second downlink transmission queue (normal IP data buffer) gets prioritized for transmission over the data in the second downlink transmission queue under the limited conditions in which the second buffer is nearly full or is full and the first buffer has sufficient reserve. The example of FIG. 10 illustrates an example in which a round robin approach is used when both the first and second buffers are nearly full or are full.

Figure 11A:
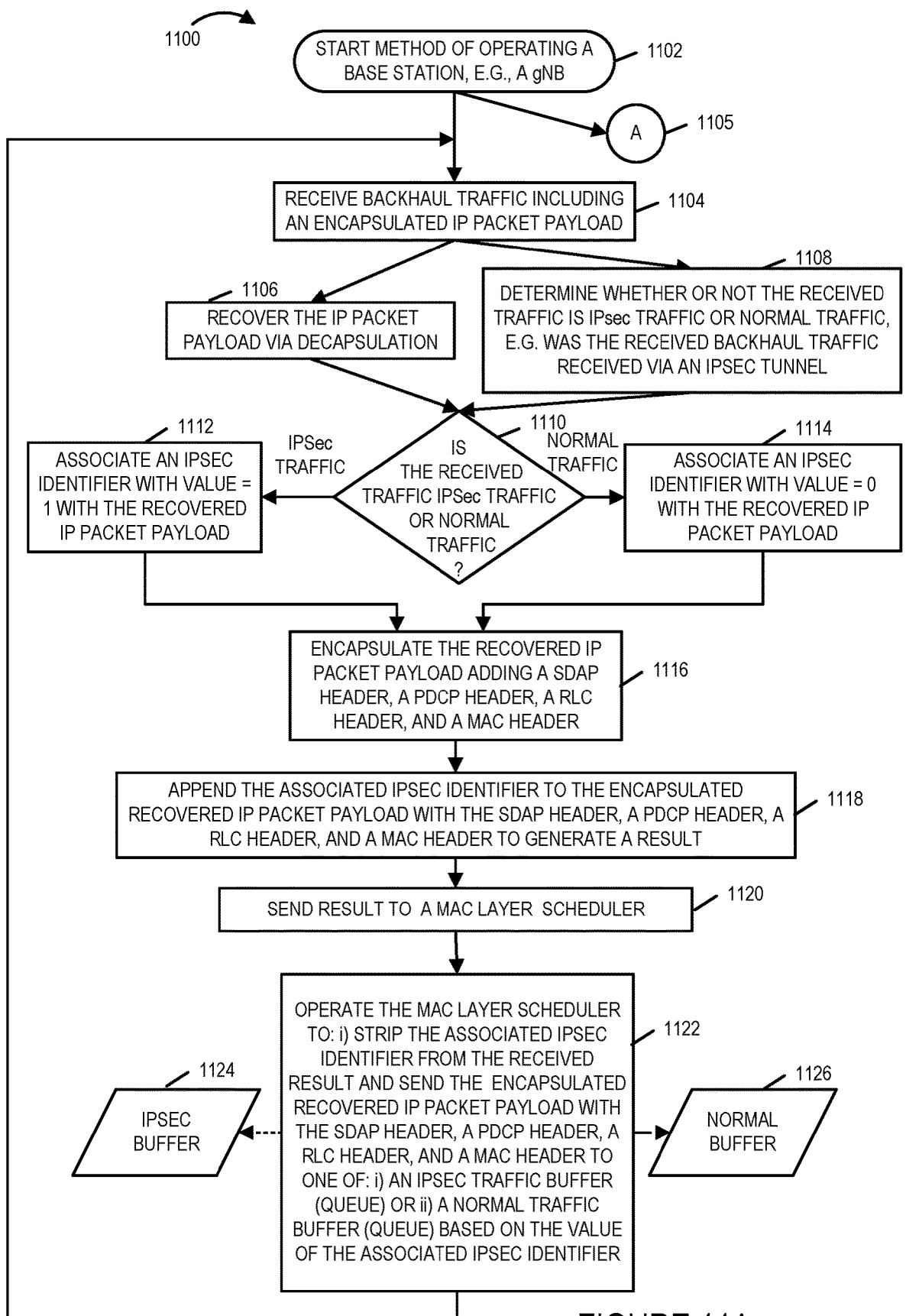
FIG. 11A is a first part of a flowchart of an exemplary method of operating a base station, e.g. a gNB, in accordance with an exemplary embodiment.
Figures 11, 11A, 11B:
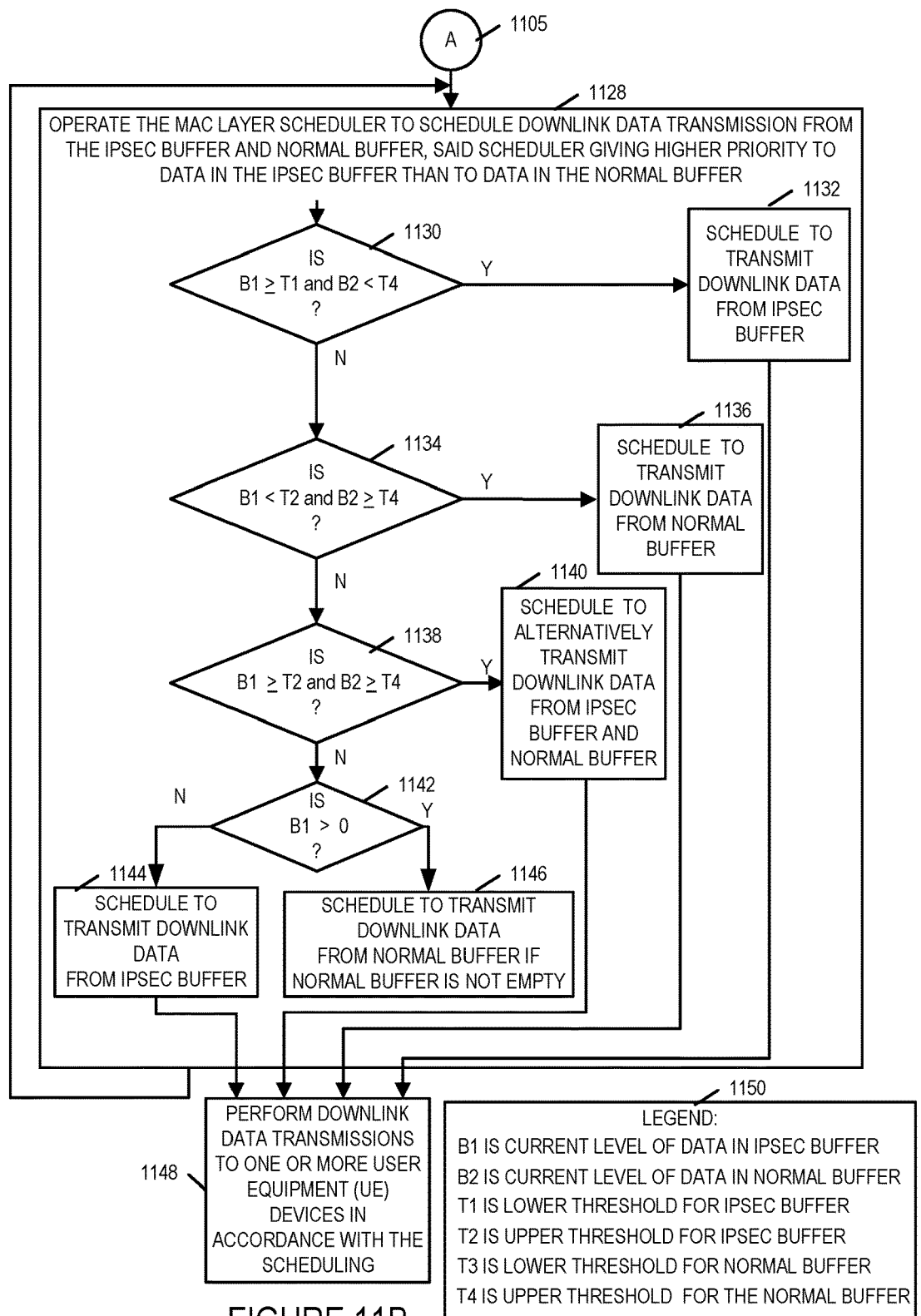
FIG. 11B is a second part of a flowchart of an exemplary method of operating a base station, e.g. a gNB, in accordance with an exemplary embodiment.
FIG. 11 comprises the combination of FIG. 11A and FIG. 11B.

FIG. 11, comprising the combination of FIG. 11A and FIG. 11B is a flowchart 1100 of an exemplary method of operating a base station, e.g., a 5G gNB, in accordance with an exemplary embodiment. In some embodiments, the base station is a Citizens Broadband Radio Service Device (CBSD). Operation starts in step 1102 in which the base station is powered on and initialized. Operation proceeds from start step 1102 to step 1104, and via connecting node A 1105, to step 1128.

In step 1104 the base station receives backhaul traffic including an encapsulated IP packet payload. Operation proceeds from step 1104 to step 1106 and step 1108. In step 1106 the base station recovers the IP packet payload via decapsulation. In step 1108 the base station determines whether or not the received traffic is IPsec traffic or normal traffic, e.g., was the received backhaul traffic received via an IPsec tunnel. Operation proceeds from step 1106 and step 1108 to step 1110. In step 1110 if the determination is that the received traffic is IPsec traffic, e.g., the received traffic was received via an IPsec tunnel, then operation proceeds from step 1110 to step 1112, in which the base station associates an IPsec identifier with a value=1 with the recovered IP packet payload of step 1106. However, in step 1110 if the determination is that the received traffic is normal IP traffic, e.g. the received traffic was received via not received via an IPsec tunnel, then operation proceeds from step 1110 to step 1114, in which the base station associates an IPsec identifier with a value=0 with the recovered IP packet payload of step 1106. Operation proceeds from step 1112 or step 1114 to step 1116.

In step 1116 the base station encapsulates the recovered IP packet payload adding a SDAP header, a PDCP header, a RLC header and a MAC header. Operation proceeds from step 1116 to step 1118. In step 1118 the base station appends the associated IPsec identifier (from step 1112 or step 1114) to the encapsulated IP packet payload with the SDAP header, PDCP header, RLC header and MAC header to generate a result. Operation proceeds from step 1118 to step 1120.

In step 1120 the base station sends the result of step 1118 to the MAC layer packet scheduler for processing. Operation proceeds from step 1120 to step 1122. In step 1122 the MAC layer scheduler is operated to receive the communicated data/information sent in step 1122 and process the received data/information. In step 1122 the MAC layer scheduler strips the associated IPsec Identifier from the received result and sends the encapsulated recovered IP packet payload with the SDAP header, PDCP header, RLC header, and MAC header to one of: i) an IPsec traffic buffer (IPsec traffic queue) 1124 or ii) a normal IP traffic buffer (normal IP traffic queue) 1126 based on the value of the received associated IPsec identifier. For example, if the value of the associated IPsec identifier=1, then the data goes into a IPsec buffer 1124 (which is a first downlink transmission buffer); however, if the value of the associated IPsec identifier=0, then the data goes into normal IP buffer 1126 (which is a second downlink transmission buffer). Operation proceeds from step 112 to the input of step 1104, in which additional backhaul traffic to be processed is received. During some iterations of step 1104 the received backhaul traffic is received via a IPsec tunnel, e.g. coupling the base station to a secure server in a data center. During some iterations of step 1104 the received backhaul traffic is received via a communications link not using an IPsec tunnel. Use of an IPsec tunnel adds latency to the communications.

Returning to step 1128, in step 1128 the MAC layer scheduler is operated to schedule downlink data transmissions from the IPsec buffer 1124 and the normal buffer 1126, said scheduler giving higher priority to data in the IPsec buffer than to data in the normal buffer. Legend 1150, included as part of FIG. 11B, identifies various labels (B1, B2, T1, T2, T3, T4) used in the step 1128. B1 is the current level of data in the IPsec buffer 1124. B2 is the current level of data in the normal buffer 1126. T1 is the lower threshold for the IPsec buffer 1124. T2 is the upper threshold for the IPsec buffer 1124. T3 is the lower threshold for the normal buffer 1126. T4 is the upper threshold for the normal buffer 1126.

Step 1128 includes steps 1130, 1132, 1134, 1136, 1138, 1140, 1142, 1144 and 1146. In step 1130 the scheduler determines if both: i) the current data level B1 of the IPsec buffer 1124 is greater than or equal to the lower threshold T1 and ii) the current data level B2 of the normal buffer 1124 is less than the upper threshold T4. If both of those conditions are satisfied, then operation proceeds from step 1130 to step 1132 in which the scheduler schedules to transmit downlink data from IPsec buffer 1124. (Data from the IPsec buffer is given higher priority for transmission provided there is sufficient data to transmit in the IPsec buffer and the normal buffer is not full or nearly full.) However, if both of those conditions (of step 1130) are not satisfied, then operation proceeds from step 1130 to step 1134.

In step 1134 the scheduler determines if both: i) the current data level B1 of the IPsec buffer 1124 is less than the upper threshold T2 and ii) the current data level B2 of the normal buffer 1124 is greater than or equal to the upper threshold T4. If both of those conditions are satisfied, then operation proceeds from step 1134 to step 1136 in which the scheduler schedules to transmit downlink data from normal buffer 1126. (Data from the normal buffer is given higher priority for transmission under the limited condition that the normal buffer is full or nearly full and that the IPsec buffer has sufficient reserve margin to buffer additional data.) However, If both of those conditions (of step 1134) are not satisfied, then operation proceeds from step 1134 to step 1138.

In step 1138 the scheduler determines if both: i) the current data level B1 of the IPsec buffer 1124 is greater than or equal to the upper threshold T2 and ii) the current data level B2 of the normal buffer 1124 is greater than or equal to the upper threshold T4. If both of those conditions are satisfied, then operation proceeds from step 1138 to step 1140 in which the scheduler schedules to alternatively transmit downlink data from IPsec buffer 1124 and the normal buffer 1126, e.g., using a round robin approach. (In this situation both of the buffers are nearly full or full so transmissions are made from each buffer to try to keep both buffers from overflowing.) However, if both of those conditions (of step 1138) are not satisfied, then operation proceeds from step 1138 to step 1142.

In step 1142 the scheduler determines if the current data level B1 of the IPsec buffer 1124 is greater than 0, e.g., the IPsec buffer includes at least some data and is not empty. If the condition is satisfied (e.g., the IPsec buffer is not empty), then operation proceeds from step 1142 to step 1144 in which the scheduler schedules to transmit downlink data from IPsec buffer 1124. However, if the condition (of step 1142) is not satisfied (e.g., the IPsec buffer is empty), then operation proceeds from step 1142 to step 1146. In step 1146 the scheduler schedules to transmit downlink data from normal buffer 1126 provided the normal buffer is not empty.

Step 1128 is performed repetitively, e.g., on an ongoing basis in accordance with a predetermined schedule.

Operation proceeds from step 1132, 1136, 1140, 1144 or step 1146, for each iteration of step 1128, to step 1148. In step 1148 the base station performs downlink data transmissions to one or more user equipment (UE) devices in accordance with the scheduling decisions of step 1128.

Figure 12A:
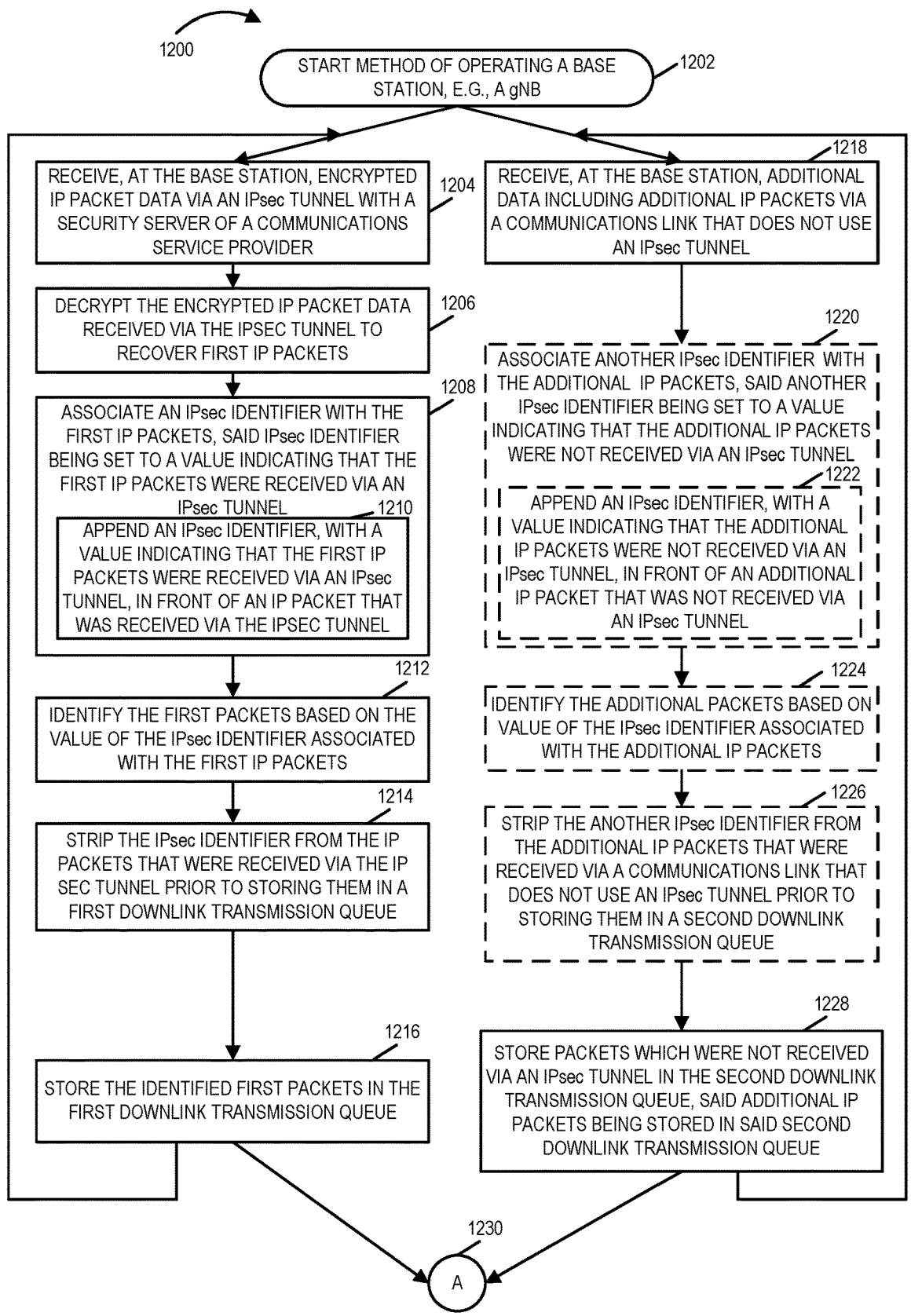
FIG. 12A is a first part of a flowchart of an exemplary method of operating a base station, e.g. a gNB, in accordance with an exemplary embodiment.
Figures 12, 12A, 12B:
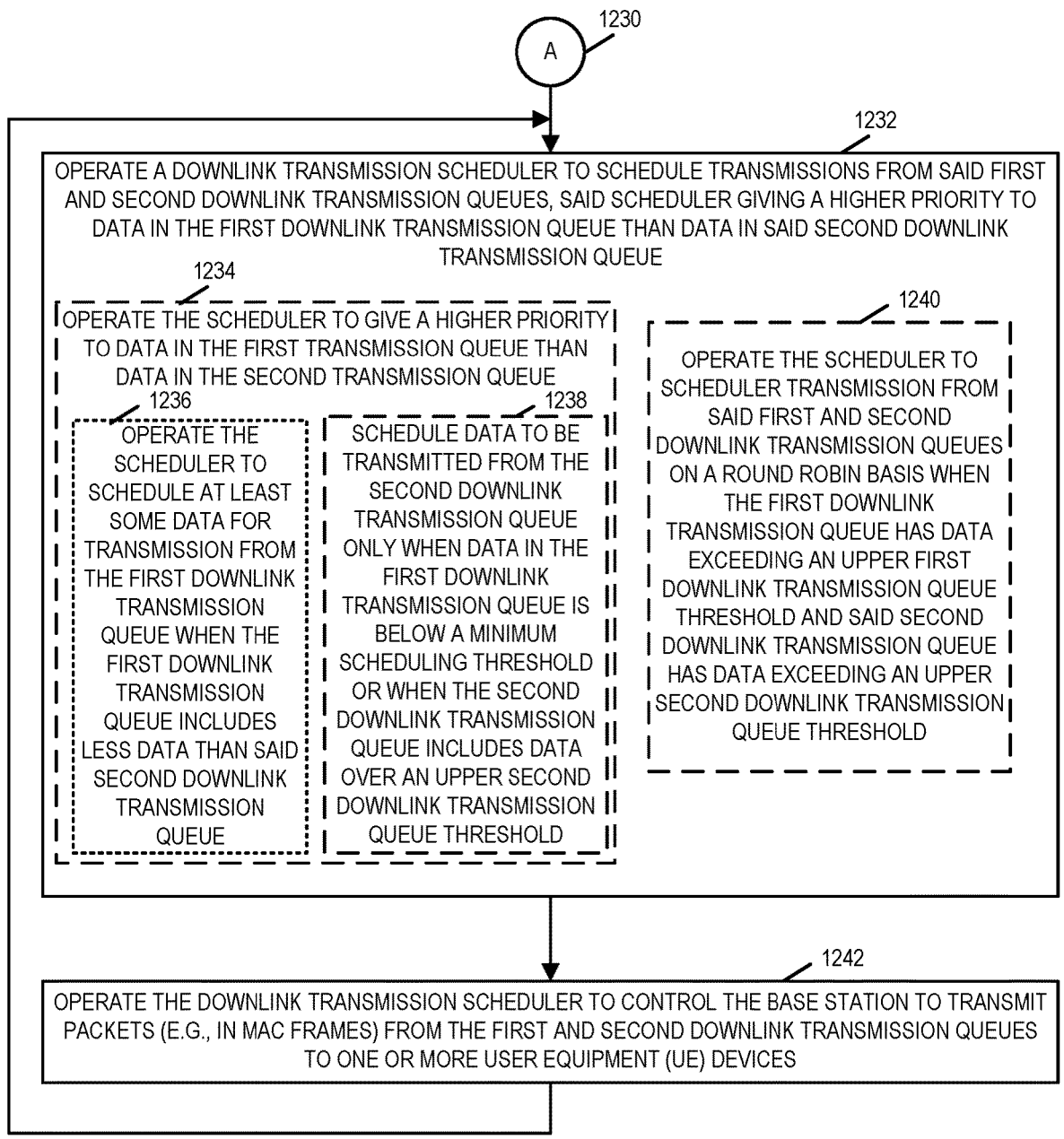
FIG. 12B is a second part of a flowchart of an exemplary method of operating a base station, e.g. a gNB, in accordance with an exemplary embodiment.
FIG. 12 comprises the combination of FIG. 12A and FIG. 12B.

FIG. 12, comprising the combination of FIG. 12A and FIG. 12B, is a flowchart 1200 of an exemplary method of operating a base station, e.g., a gNB, in accordance with an exemplary embodiment. The base station implementing the method of flowchart 1200 is, e.g., one of the base stations (102, 112, 114, 116) of system 1500 of FIG. 15 and/or base station 1300 of FIG. 13. Operation of the exemplary method starts in step 1202, in which the base station is powered on and initialized. Operation proceeds from start step 1202 to step 1204 and step 1218.

In step 1204 the base station receives encrypted IP packet data, e.g., encrypted user data IP packets, via an IPsec tunnel with a security server of a communications service provider. Operation proceeds from step 1204 to step 1206. In step 1206 the base station decrypts the encrypted IP packet data received via the IPsec tunnel to recover first IP packets. Operation proceeds from step 1206 to step 1208.

In step 1208 the base station associates an IPsec identifier with first IP packets (e.g., appends an IPsec identifier to each of the first IP packets), said IPsec identifier being set to a value (e.g., 1) indicating that the first IP packets were received via an IPsec tunnel. Step 1208 includes step 1210, in which the base station appends an IPsec identifier, with a value (e.g., 1) indicating that the first IP packets were received via an IPsec tunnel, in front of an IP packet that was received via the IPsec tunnel. Operation proceeds from step 1208 to step 1212.

In step 1212 the base station identifies the first packets based on the IPsec identifier associated with the first IP packets. Operation proceeds from step 1212 to step 1214.

In step 1214 the base station strips the IPsec identifier from the IP packets that were received via the IPsec tunnel prior to storing them in a first downlink transmission queue. Operation proceeds from step 1214 to step 1216.

In step 1216 the base station stores the identified first packets in the first downlink transmission queue. Operation proceeds from step 1216 to the input of step 1204.

Returning to step 1218, in step 1218 the base station receives additional data including additional IP packets (e.g., normal data such as control data sent between base stations and which is to be communicated to a UE as part of a handoff) via a communications link that does not use and IPsec tunnel. In some embodiments, operation proceeds from step 1218 to step 1220. In other embodiments, operation proceeds from step 1218 to step 1228.

In step 1220 the base station associates another IPsec identifier with the additional IP packets (e.g., appends another IPsec identifier to each of the additional IP packets), said another IPsec identifier being set to a value (e.g., 0) indicating that the additional IP packets were not received via an IPsec tunnel. In some such embodiments, step 1220 includes step 1222. In step 1222 the base station appends an IPsec identifier, with a value (e.g., 0) indicating that the additional IP packets were not received via an IPsec tunnel, in front of an additional IP packet that was not received via an IPsec tunnel. Operation proceeds from step 1220 to step 1224.

In step 1224 the base station identifies the additional packets based on the value of the IPsec identifier associated with the additional IP packets. Operation proceeds from step 1224 to step 1226.

In step 1226 the base station strips the IPsec identifier from the additional IP packets that were received via a communications link that does not use an IPsec tunnel prior to storing them in a second downlink transmission queue. Operation proceeds from step 1226 to step 1228. In step 1228 the base station stores packets which were not received via an IPsec tunnel in the second downlink transmission queue, said additional IP packets being stored in said second downlink transmission queue. Operation proceeds from step 1228 to the input of step 1218.

Operation proceeds from step 1216 and step 1228, via connecting node A 1230 to step 1232. In step 1232 the base station operates a downlink transmission scheduler to schedule transmissions from said first and second downlink transmission queues, said scheduler giving a higher priority to data in the first downlink transmission queue than data in said second downlink transmission queue. In some embodiments, step 1232 includes one or both of step 1234 and 1240. In step 1234 the base station operates the downlink transmission scheduler to give a higher priority to data in the first downlink transmission queue than to data in the second downlink transmission queue. In some embodiments, step 1234 includes one or both of steps 1236 and 1238.

In step 1236 the scheduler is operated to schedule at least some data for transmission from the first downlink transmission queue when the first downlink transmission queue includes less data than said second downlink transmission queue, e.g., when the first downlink transmission queue includes data over a minimum threshold and the second downlink transmission queue includes data below an upper second downlink transmission queue threshold used to indicate the second downlink transmission queue (buffer) is full or nearly full.

In step 1238 the scheduler is operated to schedule data to be transmitted from the second downlink transmission queue only when data in the first transmission queue is below a minimum scheduling threshold or when the second downlink transmission queue includes data over an upper second downlink transmission queue threshold.

In step 1240 the base station operates the scheduler to schedule transmission from the first and second downlink transmission queues on a round robin basis when the first downlink transmission queue has data exceeding an upper first downlink transmission queue threshold (e.g., indicating fullness of the first downlink transmission queue) and said second downlink transmission queue has data exceeding an upper second downlink transmission queue threshold (e.g., indicating fullness of the second downlink transmission queue). Operation proceeds from step 1232 to step 1242.

In step 1242 the base station operates the downlink transmission scheduler to control the base station to transmit packets, e.g., in MAC frames, from the first and second downlink transmission queues to one or more user equipment (UE) devices, e.g., in accordance with scheduling of step 1232. Operation proceeds from step 1242 to the input of step 1232.

In some embodiments, the first IP packets communicated via an IPsec tunnel are user data packets being communicated between a first UE device (e.g., UE 1 152) and a second UE device (e.g., UE 2 154), said second UE device being in a first cell (e.g., cell 103) corresponding to said base station (e.g. base station 1 102) and the first UE device being in a second cell (e.g., cell 115) corresponding to an another base station (e.g., base station 3 114). For example, the first IP packets are voice packets which are part of an end to end communications session between UEs (e.g., UE 1 152 and UE 2 154) located at two different base stations (BS 3 114, BS 1 102). In some such embodiments, the additional data packets are control packets communicated from a base station (e.g., base station 2 112) of another cell (e.g., cell 113), e.g., handoff related communications packets) that are directed to a UE (e.g., UE 3 156) served by the base station (e.g., base station 1 102). In some other embodiments, the additional data packets are user data packets communicated between a third UE device (e.g., UE 4 154) and a fourth UE device (e.g., UE 5 156) attached to the base station (BS 1 102) and which do not traverse an IPsec tunnel.

In some embodiments, the step of associating the first IP packets is performed as an IP layer operation; and the step of identifying the first IP packets is performed as a MAC layer operation.

In some embodiments, said step of storing the identified first packets in the first downlink transmission queue is performed by a MAC layer packet scheduler that schedules the transmission of frames including one or more IP packet portions.

Figure 13:
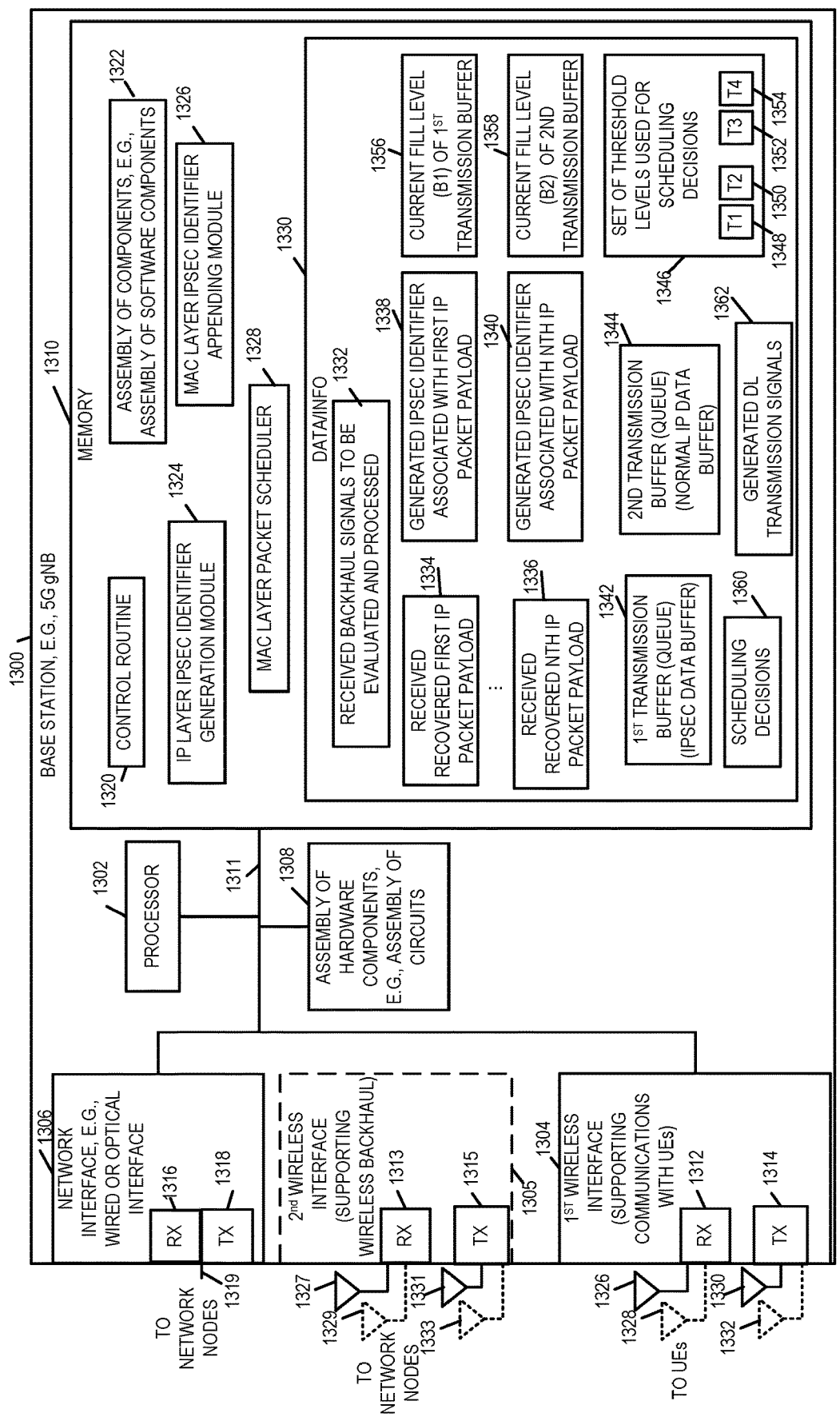
FIG. 13 is a drawing of an exemplary base station, e.g. a gNB, implemented in accordance with an exemplary embodiment.

FIG. 13 is a drawing of an exemplary base station 1300, e.g., a 5G gNB, implemented in accordance with an exemplary embodiment. In some embodiments, exemplary base station 1300 is a Citizens Broadband Radio Services Device (CBSD). Exemplary base station 1300 is, e.g., a base station implementing the method of flowchart 1100 of FIG. 11 and/or the method of flowchart 1200 of FIG. 12.

Exemplary base station 1300 includes a processor 1302, e.g. a CPU, a 1st wireless interface 1304 supporting wireless communications with user equipment (UE) devices, one or both of: network interface 1306, e.g. a wired or optical interface, supporting backhaul communications with other network nodes, and 2nd wireless interface 1305 supporting wireless backhaul communications with other network nodes, an assembly of hardware components 1308, e.g., an assembly of circuits, and memory 1310 coupled together via a bus 1311 over which the various elements may interchange data and information. 1st wireless interface 1304 includes wireless receiver 1312 coupled to one or more receive antennas (1326, . . . , 1328), via which the base station 1300 receives uplink signals from UE devices. 1st wireless interface 1304 further includes wireless transmitter 1314 coupled to one or more receive antennas (1330, . . . , 1332), via which the base station 1300 transmits downlink signals to UE devices. Network interface 1306, e.g., a wired or optical interface, includes a receiver 1316 and a transmitter 1318. The receiver 1316 and transmitter 1318 are coupled to a connector 1319 which couples the network interface 1306 to a wire or optical cable. Receiver 1316 receives signals sent from other network nodes, e.g., signals conveying an IP packet payload communicated via a IPsec tunnel, from a security server and signals conveying an IP packet payload communicated via a communications path which does not include an IPsec tunnel. 2nd wireless interface 1305 includes wireless receiver 1313 coupled to one or more receive antennas (1327, . . . , 1329), via which the base station 1300 receives wireless backhaul signals from network nodes. The signals received via receiver 1313 include IP packet payloads conveyed via IPsec tunnels and IP packet payloads conveyed without using an IPsec tunnel. 2nd wireless interface 1305 further includes wireless transmitter 1315 coupled to one or more receive antennas (1331, . . . , 1333), via which the base station 1300 transmits wireless backhaul signals to network nodes.

Memory 1310 includes a control routine 1320, e.g. for performing routine base station control operation such as accessing memory, loading instructions into the processor, etc., an assembly of components 1322, e.g. an assembly of software components, e.g. routines, an IP layer IPsec identifier generation module 1324 configured to generate, at the IP layer, a IPsec identifier for a received IP packet payload indicating whether or not the IP packet payload was received via an IPsec tunnel, a MAC layer identifier appending module 1326 configured to append, at the MAC layer, a generated IPsec Identifier in front of the corresponding IP packet payload with a set of air interface headers, a MAC layer packet scheduler 1328 configured, in some embodiments, to: receive IPsec identifiers and corresponding IP packet payloads, store an IP packet payload in a first transmit buffer (IPsec data buffer) or second transmit buffer (normal IP data buffer), based on the value of the IPsec Identifier, and make scheduling decisions for downlink transmission based on the current amount of data in the first and second transmit buffers and a set of threshold levels 1346. Memory 1310 further includes data/information 1330.

Data/information 1330 includes received backhaul signals to be evaluated and processed 1332, a plurality of received recovered IP packets payloads (received recovered first IP packet payload 1334, . . . , received recovered Nth IP packet payload 1336), corresponding generated IPsec identifiers (markers) associated with the received recovered IP packet payloads (generated IPsec Identifier associated with first IP packet payload 1338, . . . , generated IPsec Identifier associated with Nth IP packet payload 1340), a first transmission buffer (queue) 1342, sometimes referred to as IPsec data buffer, a second transmission buffer (queue) 1344, sometimes referred to as normal IP data buffer, and a set of threshold levels 1346 used, e.g., by the MAC scheduler 1328, for scheduling decisions 1346. Set of threshold levels 1346 includes a lower threshold (T1) 1348 for the first transmission buffer (IPsec data buffer) 1342, an upper threshold (T2) 1350 for the first transmission buffer (IPsec data buffer) 1342, a lower threshold (T3) 1352 for the second transmission buffer (normal IP data buffer) 1344, and an upper threshold (T4) 1354 for the second transmission buffer (normal IP data buffer) 1344. Data/information 1330 further includes a current data fill level (B1) 1356 of the first transmission buffer (IPsec data buffer) 1342, and a current data fill level (B2) 1358 of the second transmission buffer (normal IP data buffer) 1344, scheduling decisions 1360, e.g. from the scheduler 1328 e.g., each scheduling decision indicating whether the base station is to transmit downlink data from the 1st transmission buffer, the 2nd transmission buffer or both, for a particular scheduling opportunity, and generated downlink transmission signals 1362 generated in response to the scheduling decisions.

Figure 14A:
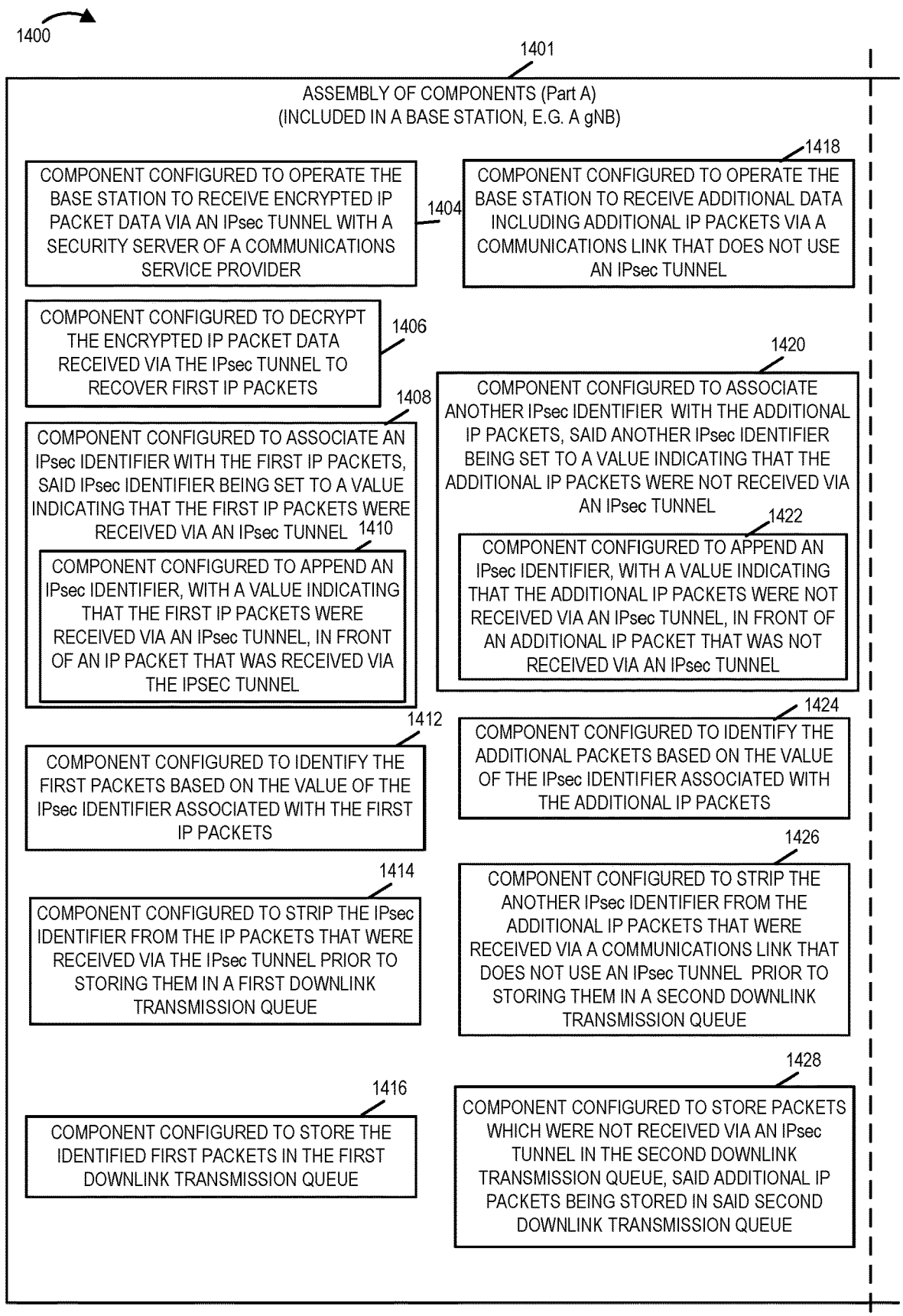
FIG. 14A is a first part of an exemplary assembly of components which may be included in a base station in accordance with an exemplary embodiment.
Figure 14B:
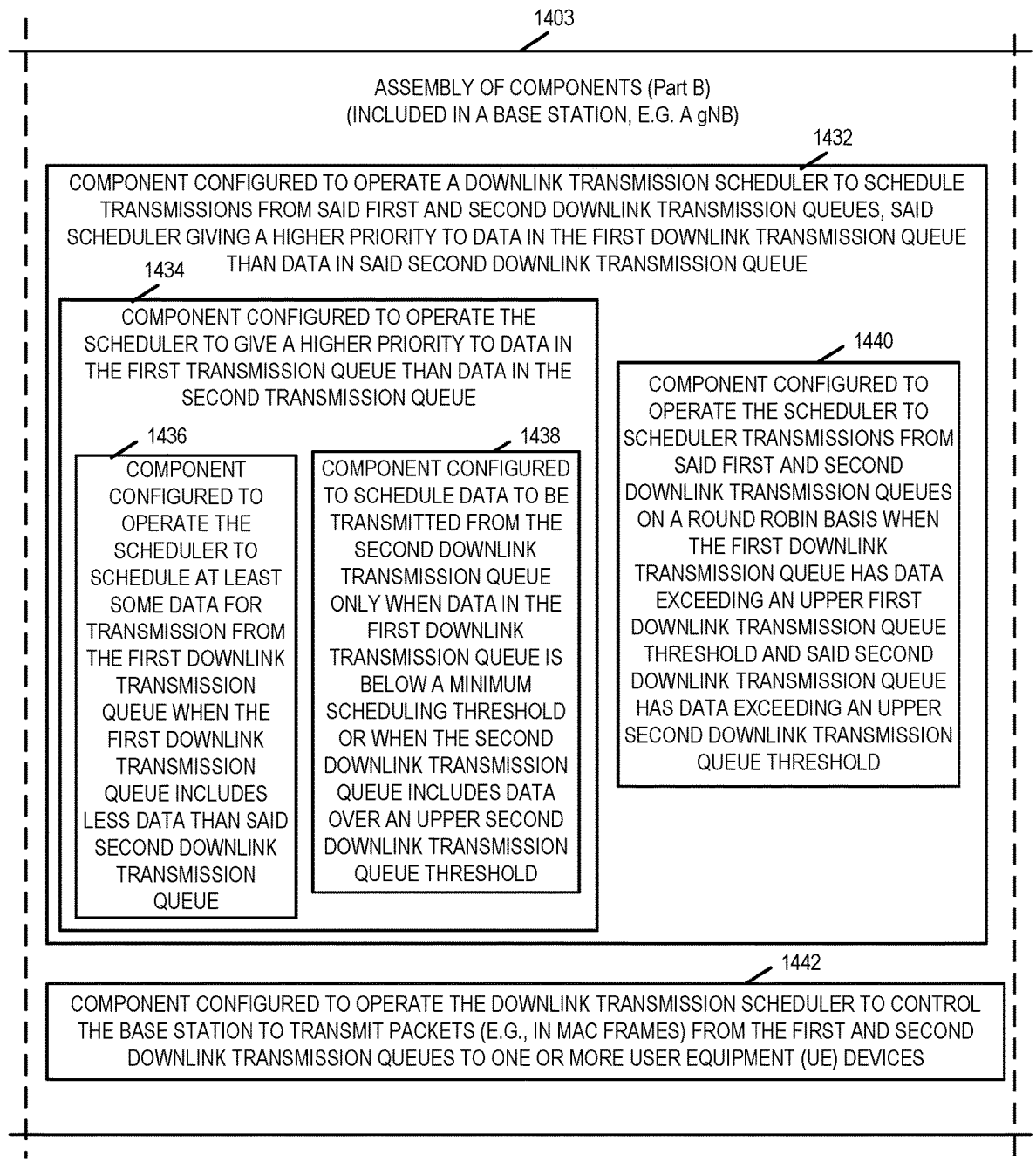
FIG. 14B is a second part of an exemplary assembly of components which may be included in a base station in accordance with an exemplary embodiment.
Figure 14C:
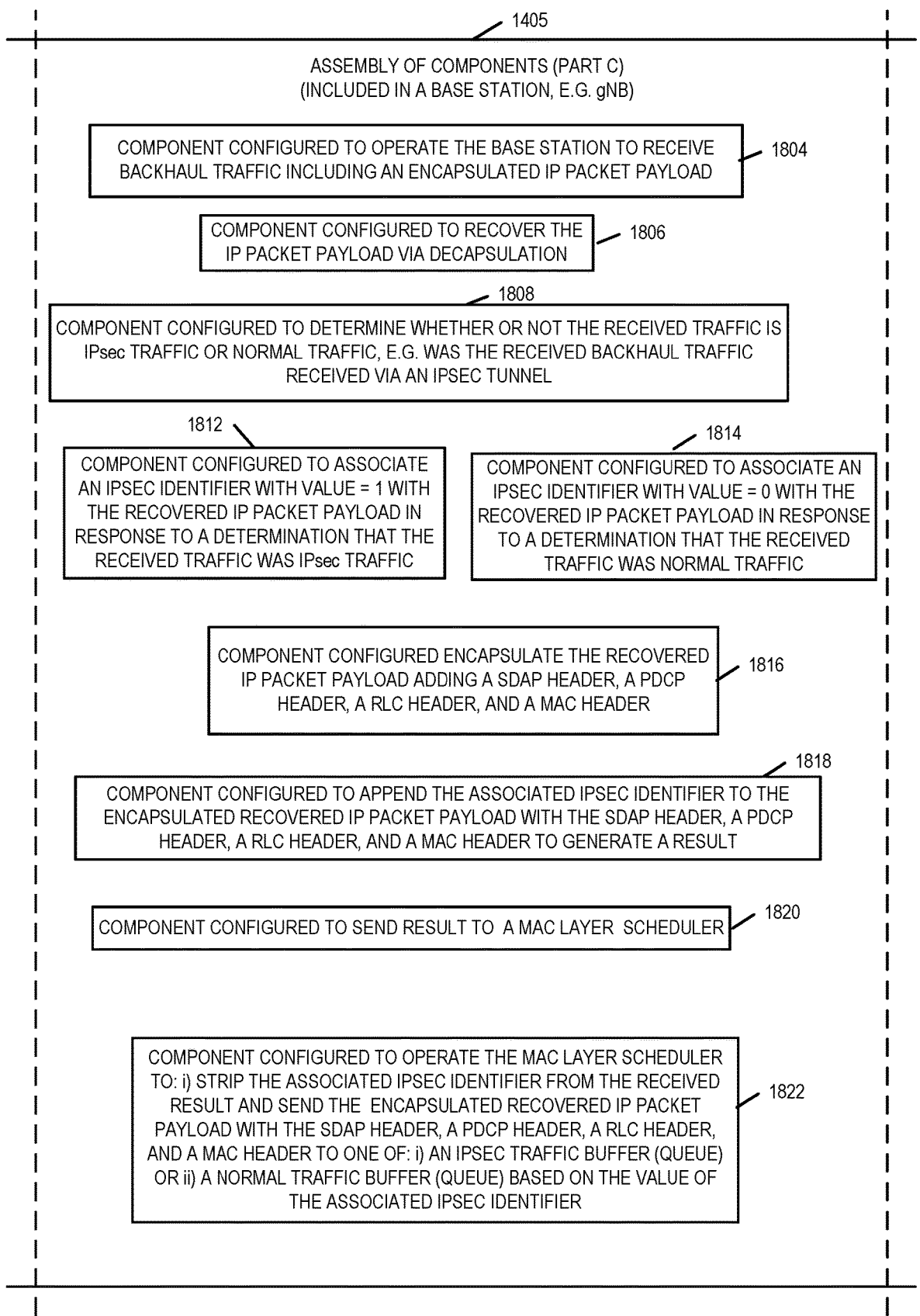
FIG. 14C is a third part of an exemplary assembly of components which may be included in a base station in accordance with an exemplary embodiment.

FIG. 14, comprising the combination of FIG. 14A, FIG. 14B, FIG. 14C and FIG. 14D, is a drawing of an assembly of components 1400, comprising Part A 1401, Part B 1403, Par C 1405 and Pard D 1404, which may be included in an exemplary base station, e.g., a gNB, in accordance with an exemplary embodiment. Assembly of components 1400 is, e.g., included in any of the base stations (base station 1 102, base station 2 112, base station 3 114, . . . , base station N 116) of FIG. 15, base station 1300 of FIG. 13, and/or a base station implementing steps of the method of flowchart 1100 of FIG. 11 and/or the method of flowchart 1200 of FIG. 12.

The components in the assembly of components 1400 can, and in some embodiments are, implemented fully in hardware within a processor, e.g., processor 1302, e.g., as individual circuits. The components in the assembly of components 1400 can, and in some embodiments are, implemented fully in hardware within the assembly of hardware components 1408, e.g., as individual circuits corresponding to the different components. In other embodiments some of the components are implemented, e.g., as circuits, within processor 1302 with other components being implemented, e.g., as circuits within assembly of components 1308, external to and coupled to the processor 1302. As should be appreciated the level of integration of components on the processor and/or with some components being external to the processor may be one of design choice. Alternatively, rather than being implemented as circuits, all or some of the components may be implemented in software and stored in the memory 1310 of the base station 1300, with the components controlling operation of base station 1300 to implement the functions corresponding to the components when the components are executed by a processor e.g., processor 1302. In some such embodiments, the assembly of components 1400 is included in the memory 1310 as part of assembly of software components 1322. In still other embodiments, various components in assembly of components 1400 are implemented as a combination of hardware and software, e.g., with another circuit external to the processor providing input to the processor which then under software control operates to perform a portion of a component's function.

When implemented in software the components include code, which when executed by a processor, e.g., processor 1302, configure the processor to implement the function corresponding to the component. In embodiments where the assembly of components 1400 is stored in the memory 1310, the memory 1310 is a computer program product comprising a computer readable medium comprising code, e.g., individual code for each component, for causing at least one computer, e.g., processor 1302, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 14 control and/or configure the base station 1300 or elements therein such as the processor 1302, to perform the functions of corresponding steps illustrated and/or described in the method of one or more of the flowcharts, signaling diagrams and/or described with respect to any of the Figures. Thus, the assembly of components 1400 includes various components that perform functions of corresponding one or more described and/or illustrated steps of an exemplary method, e.g., steps of the method of flowchart 1100 of FIG. 1 and/or steps of the method of flowchart 1200 of FIG. 12.

Assembly of components 1400 includes a component 1404 configured to operate the base station to receive encrypted IP packet data (e.g., encrypted user data IP packets) via an IPsec tunnel with a security server of a communications service provider, a component 1406 configured to decrypt the encrypted IP packet data received via the IPsec tunnel to recover first IP packets, and a component 1408 configured to associate an IPsec identifier with the first IP packets (e.g., append an IPsec identifier to each of the first IP packets), said IPsec identifier being set to a value (e.g., 1) indicating that the first IP packets were received via an IPsec tunnel. Component 1408 includes a component 1410 configured to append an IPsec identifier, with a value (e.g., 1) indicating that the first IP packets were received via an IPsec tunnel, in front of an IP packet that was received via the IPsec tunnel. Assembly of components 1400 further includes a component 1412 configured to identify the first packets based on the value of the IPsec identifier associated with the first IP packets, a component 1414 configured to strip the IPsec identifier from the IP packets that were received via the IPsec tunnel prior to storing them in a first downlink transmission queue, and a component 1416 configured to store the identified first packets in the first downlink transmission queue.

Assembly of components 1400 further includes a component 1418 configured to operate the base station to receive additional data including additional IP packets (e.g., normal data such as control data sente between base station and which is to be communicated to a UE as part of a handoff) via a communications link that does not use an IPsec tunnel, and a component 1420 configured to associate another IPsec identifier with the additional IP packets, (e.g., append said another IPsec identifier to each of the additional IP packets), said another IPsec identifier being set to a value (e.g., 0) indicating that the additional IP packets were not received via an IPsec tunnel. Component 1420 includes a component 1422 configured to append an IPsec identifier, with a value (e.g., 0) indicating that the additional IP packets were not received via an IPsec tunnel, in front of an additional IP packet that was received via an IPsec tunnel. Assembly of components 1400 further includes a component 1424 configured to identify the additional packets based on the value of the IPsec identifier associated with the additional IP packets, a component 1426 configured to strip the another IPsec identifier from the additional IP packets that were received via a communications link that does not use an IPsec tunnel prior to storing them in a second downlink transmission queue, and a component 1428 configured to store packets which were not received via an IPsec tunnel in the second downlink transmission queue, said addition IP packets being stored in said second downlink transmission queue.

Assembly of components 1400 further includes a component 1432 configured to operate a downlink transmission scheduler included in the base station, e.g., a MAC scheduler, to schedule transmissions from said first and second downlink transmission queues (e.g., first and second downlink transmission buffers), said downlink transmission scheduler giving a higher priority to data in the first downlink transmission queue than to data in said second downlink transmission queue. Component 1432 includes a component 1434 configured to operate the scheduler to give a higher priority to data in the first transmission queue than data in the second transmission queue, e.g. under a predetermined set of conditions, e.g., including using results of comparisons of current first and second downlink transmission queue data fill levels to thresholds, and a component 1440 configured to operate the downlink transmission scheduler to schedule transmissions from said first and second downlink transmission queues on a round robin basis when the first downlink transmission queue has data exceeding an upper first downlink transmission queue threshold (e.g., indicating fullness of the first downlink transmission queue) and said second downlink transmission queue has data exceeding an upper second downlink transmission queue threshold (e.g., indicating fullness of the second downlink transmission queue). Component 1434 includes a component 1436 configured to operate the scheduler to schedule at least some data for transmission from the first downlink transmission queue when the first downlink transmission queue includes less data than a second downlink transmission queue (e.g., when the first downlink transmission queue includes data over a minimum threshold and the second downlink transmission queue includes data below an upper second downlink transmission queue threshold used to indicate the second downlink transmission queue (buffer) is full or nearly full), and a component 1438 configured to schedule data to be transmitted from the second downlink transmission queue only when data in the first downlink transmission queue is below a minimum scheduling threshold, e.g., the first downlink transmission queue is empty or nearly empty, or when the second downlink transmission queue includes data over an upper second downlink transmission queue threshold, e.g., the second downlink transmission queue is full or almost full.

Assembly of components 1400 further includes a component 1442 configured to operate the downlink transmission scheduler to control the base station to transmit packets, e.g., in MAC frames, from the first and second downlink transmission queues to one or more user equipment (UE) devices, e.g., in accordance with the scheduling decisions from component 1432.

In some embodiments, the first IP packets communicated via an IPsec tunnel are user data packets being communicated between a first UE device (e.g., UE 1 152) and a second UE device (e.g., UE 2 154), said second UE device being in a first cell (e.g., cell 103) corresponding to said base station (e.g. base station 1 102) and the first UE device being in a second cell (e.g., cell 115) corresponding to an another base station (e.g., base station 3 114). For example, the first IP packets are voice packets which are part of an end to end communications session between UEs (e.g., UE 1 152 and UE 2 154) located at two different base stations (BS 3 114, BS 1 102). In some such embodiments, the additional data packets are control packets communicated from a base station (e.g., base station 2 112) of another cell (e.g., cell 113), e.g., handoff related communications packets) that are directed to a UE (e.g., UE 3 156) served by the base station (e.g., base station 1 102). In some other embodiments, the additional data packets are user data packets communicated between a third UE device (e.g., UE 4 154) and a fourth UE device (e.g., UE 5 156) attached to the base station (BS 1 102) and which do not traverse an IPsec tunnel.

In some embodiments, the component 1408 configured to associate an IPsec identifier (e.g., with value=1) with the first IP packets is an IP layer component; and the component 1412 configured to identify the first IP packets is a MAC layer component. In some such embodiments, the component 1420 configured to associate another IPsec identifier (e.g., with value=0) with the additional IP packets is an IP layer component; and the component 1424 configured to identify the additional IP packets is a MAC layer component.

In some embodiments, said component 1416 configured to store the identified first packets in the first downlink transmission queue is performed by a MAC layer packet scheduler that schedules the transmission of frames including one or more IP packet portions. In some embodiments, said component 1428 configured to store the identified additional packets in the second downlink transmission queue is performed by the MAC layer packet scheduler that schedules the transmission of frames including one or more IP packet portions.

Assembly of components 1400 further includes a component 1804 configured to operate the base station to receive backhaul traffic included an encapsulated IP packet payload, a component 1806 configured to recover the IP packet payload via decapsulation, a component 1808 configured to determine whether or not the received traffic is IPsec traffic or normal traffic, e.g. determine whether or not the received backhaul traffic received via an IPsec trunnel, a component 1812 configured to associate an IPsec identifier with value=1 with the recovered IP packet payload in response to a determination that the received traffic was IPsec traffic, and a component 1816 configured to associate an IPsec identifier with value=0 with the recovered IP packet payload in response to a determination that the received traffic was normal traffic.

Assembly of component 1400 further includes a component 1816 configured to encapsulate the recovered IP packet payload adding a Service Data Adaptation Protocol (SDAP) header, a Packet Data Convergence Protocol (PDCP) header, a Radio Link Control (RLC) header, and a Media Access Control (MAC) header, a component 1818 configured to append the associated IPsec header to the encapsulated recovered IP packet payload with the SDAP header, PDCP header, RLC header and MAC header to generate a result, a component 1820 configured to dent the generated result to a MAC layer scheduler, and a component 1822 configured to operate the MAC layer scheduler to: i) strip the associated IPsec identifier from the received result and ii) send the encapsulated recovered IP packet payload with the SDAP header, PDCP header, RLC header, and MAC header to one of: i) an IPsec traffic buffer (queue) or ii) a normal traffic buffer (queue) based on the value of the associated IPsec identifier.

Assembly of components 1400 further includes a component 1828 configured to operate the MAC layer scheduler to schedule downlink data transmissions from the IPsec buffer and normal buffer, said scheduler giving higher priority to data in the IPsec buffer than to data in the normal buffer, and a component 1848 configured to control the base station to perform downlink data transmissions to one or more user equipment (UE) devices in accordance with the scheduling of component 1828.

B1 is the current level of data in the IPsec buffer. B2 is the current level of data in the normal buffer. T1 is the lower threshold for the IPsec buffer. T2 is the upper threshold for the IPsec buffer. T3 is the lower threshold for the normal buffer. T4 is the upper threshold for the normal buffer.

Component 1828 includes a component 1830 configured to operate the MAC layer scheduler to determine if: i) the current data fill level (B1) of the IPsec buffer is greater than or equal to threshold T1 and ii) the current data fill level (B2) of the normal buffer is less than threshold T4, and a component 1830 configured to schedule to transmit downlink data from the IPsec buffer in response to a determination that: i) the current data fill level (B1) of the IPsec buffer is greater than or equal to threshold T1 and ii) the current data fill level (B2) of the normal buffer is less than threshold T4. (The IPsec buffer data gets priority provided the normal buffer is not full or almost full.)

Component 1828 further includes a component 1834 configured to operate the MAC layer scheduler to determine if: i) the current data fill level (B1) of the IPsec buffer is less than threshold T2 and ii) the current data fill level (B2) of the normal buffer is greater than or equal to threshold T4, and a component 1836 configured to schedule to transmit downlink data from the normal buffer in response to a determination that: i) the current data fill level (B1) of the IPsec buffer is less than threshold T2 and ii) the current data fill level (B2) of the normal buffer is greater than or equal to threshold T4. (The normal buffer data gets priority under the limited condition that the normal buffer is full or almost full and the IPsec buffer has sufficient reserve capacity remaining.)

Component 1828 further includes a component 1838 configured to operate the MAC layer scheduler to determine if: i) the current data fill level (B1) of the IPsec buffer is greater than or equal to threshold T2 and ii) the current data fill level (B2) of the normal buffer is greater than or equal to threshold T4, and a component 1840 configured to schedule to alternatively transmit downlink data from the IPsec buffer and normal buffer, e.g. using a round robin approach, in response to a determination that: i) the current data fill level (B1) of the IPsec buffer is greater than or equal t0 threshold T2 and ii) the current data fill level (B2) of the normal buffer is greater than or equal to threshold T4. (An alternating approach is used since both buffers are nearly full or full.)

Component 1828 further includes a component 1842 configured to determine if: i) the previous tests (by components 1830, 1834, and 1838) have not been satisfied, and ii) the current fill level (B1) of the IPsec buffer is not zero, and a component 1844 configured to schedule to transmit downlink data from the IPsec buffer in response to a determination that: i) the previous tests (by components 1830, 1834, and 1838) have not been satisfied, and ii) the current fill level (B1) of the IPsec buffer is not zero, and a component 1846 configured to schedule to transmit downlink data from the normal buffer in response to a determination that the IPsec buffer is empty and the normal buffer is not empty.

Figure 15:
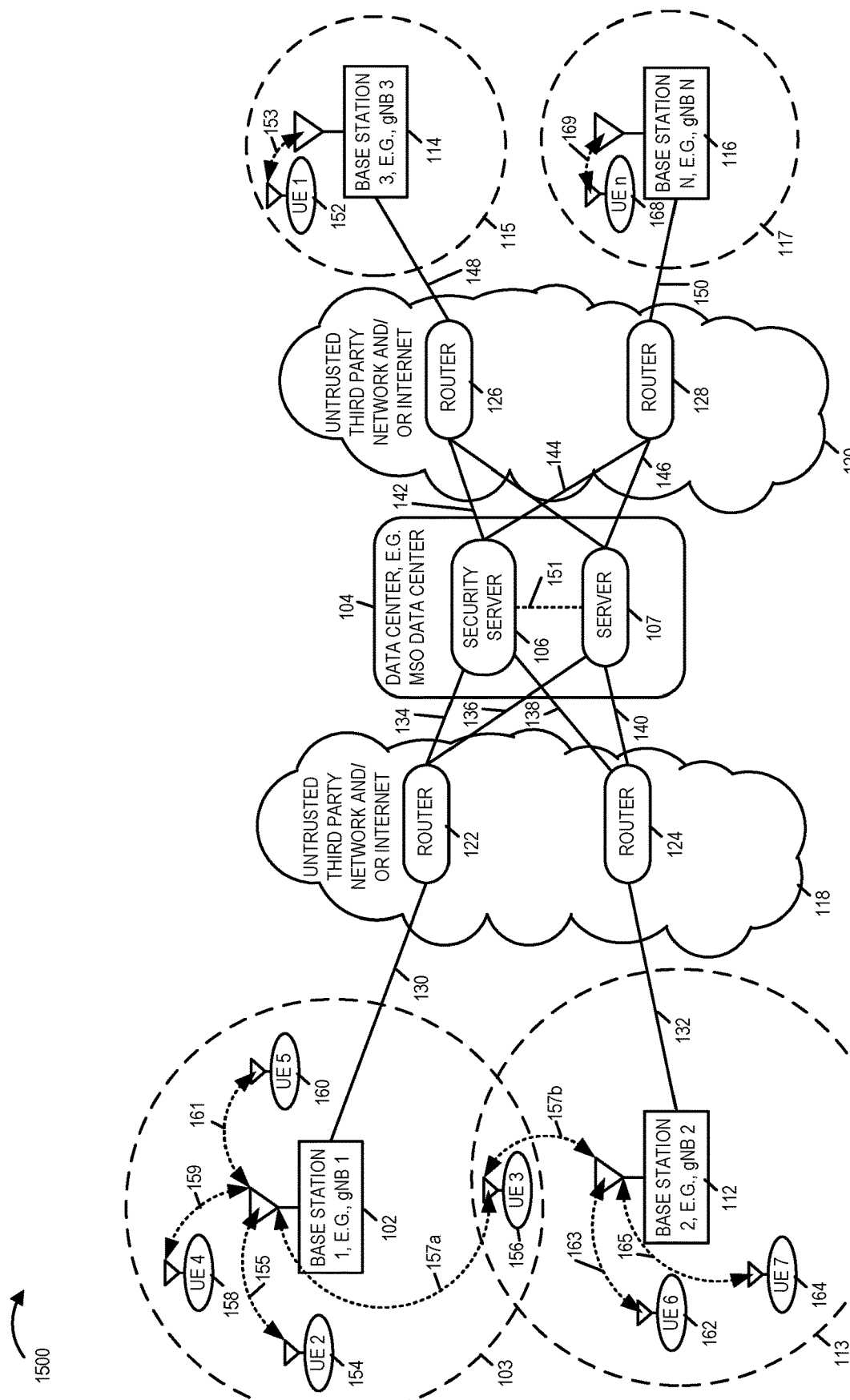
FIG. 15 is a drawing of an exemplary communications system in accordance with an exemplary embodiment.

FIG. 15 is a drawing of an exemplary communications system 1500 in accordance with an exemplary embodiment. Exemplary communications system 1500 includes a plurality of base stations (base station 1 102, e.g., gNB 1, base station 2 112, e.g., gNB 2, base station 3 114, e.g. gNB 3, . . . , base station N 116, e.g. gNB N), each with a corresponding wireless coverage area (103, 113, 115, . . . , 117), respectively, a data center 104, e.g., a MSO data center, and one or more untrusted third party network 118, 120, and a plurality of user equipment (UE) devices (UE 1 152, UE 2 154, UE 3 156, UE 4 158, UE 5 160, UE 6 162, UE 7 164, . . . , UE n 168). Data center 104 includes a security server 106 and a server 107. Untrusted third party network and/or Internet 118 includes routers 122, 124. Untrusted third party network and/or Internet 120 includes routers 126, 128. The exemplary communications system 1500 further includes a plurality of backhaul communications links (130, 132, 134, 136, 138, 140, 142, 144, 146, 148, 150, 151), which couple the various elements together as shown in FIG. 15.

At least some of the UEs are mobile devices which may move throughout the communications system 1500 and can be coupled to different base stations at different times. UE 1 152 is shown within the wireless coverage area 115 of base station 3 114 and is coupled to base station 3 114 via wireless communications link 153. UE 2 154 is shown within the wireless coverage area 103 of base station 1 102 and is coupled to base station 1 102 via wireless communications link 155. UE 3 156 is shown within the wireless coverage areas (103, 113) of base stations (base station 1 102, base station 2 112), respectively, is in the processes of the handover between the two base stations (102, 112) and is coupled to base stations (102, 112) via wireless communications links (157a, 157b), respectively. UE 4 158 is shown within the wireless coverage area 103 of base station 1 102 and is coupled to base station 1 102 via wireless communications link 159. UE 5 160 is shown within the wireless coverage area 103 of base station 1 102 and is coupled to base station 1 102 via wireless communications link 161. UE 6 166 is shown within the wireless coverage area 113 of base station 2 112 and is coupled to base station 2 112 via wireless communications link 167. UE 7 164 is shown within the wireless coverage area 113 of base station 2 112 and is coupled to base station 2 112 via wireless communications link 165. UE n 168 is shown within the wireless coverage area 117 of base station N 116 and is coupled to base station N 116 via wireless communications link 169.

In some embodiments, one or more or all of the base stations (base station 1 102, base station 2 112, base station 3 114, . . . , base station 116) are part of an operator's network (e.g., MSO network) to which the data center 104 also belongs, and the untrusted third party network belongs to a different network operator. In some such embodiments, one or more or all of the base stations (base station 1 102, base station 2 112, base station 3 114, . . . , base station 116) are CBSDs.

In some embodiments, one or more or all of the base stations (base station 1 102, base station 2 112, base station 3 114, . . . , base station 116) belong to a network operator which is different than the network operator of the data center 104. In some such embodiments, one or more or all of the base station (base station 1 102, base station 2 112, base station 3 114, . . . , base station N 116) are cellular network base station belonging to a cellular carrier and the data center belongs to an MSO, which is different than the cellular network operator.

In some embodiments, the untrusted third party network, e.g. untrusted third party network 118 and a base station, e.g. base station 1 102, belong to the same network operator, e.g. a cellular carrier operator, which is different than the data center 104 operator, e.g., a MSO such as cable network operator.

Figure 16:
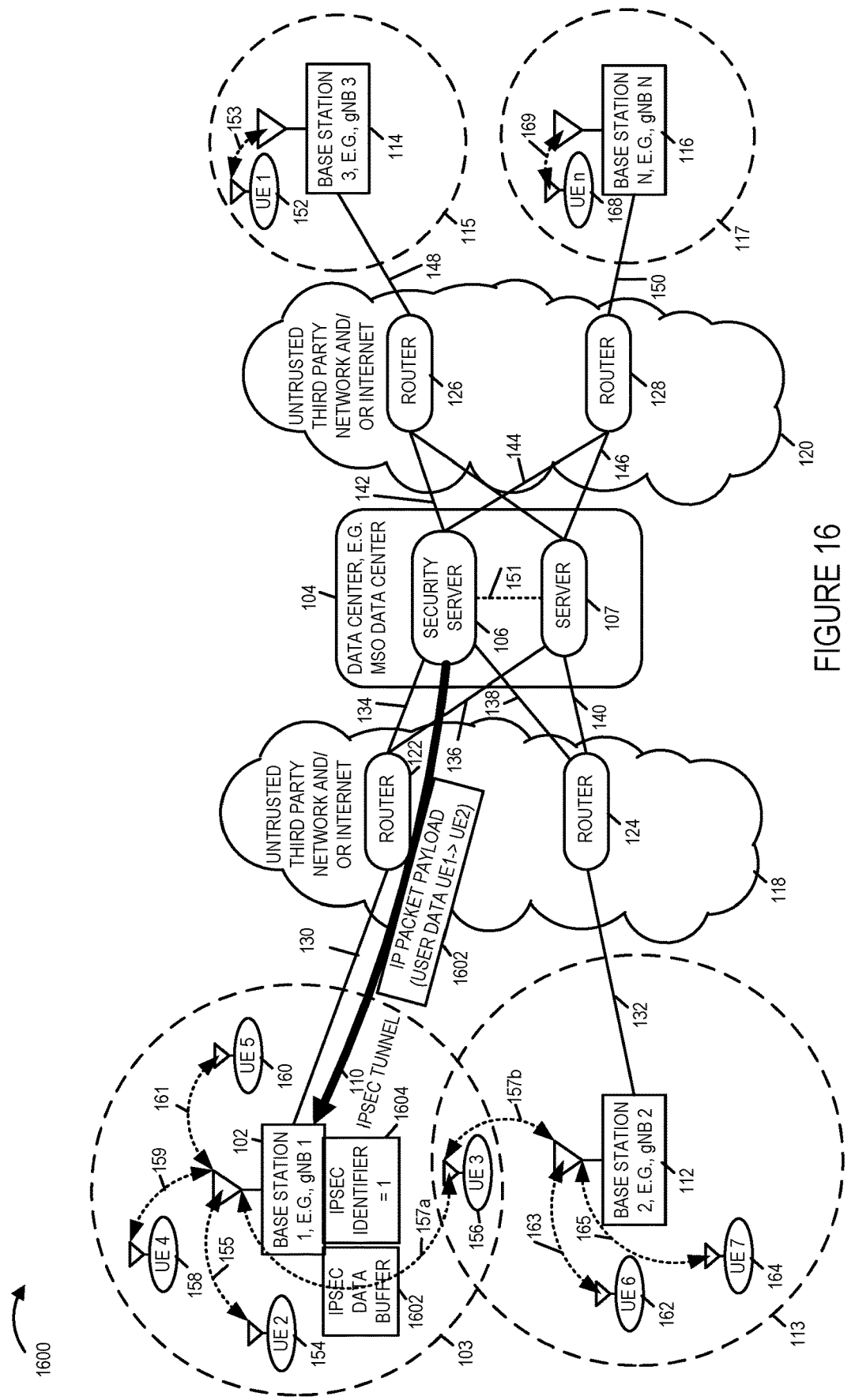
FIG. 16 is a drawing illustrating an example of IP data (IP data packets) being communicated (in encrypted form) to a base station via an IPsec tunnel, being received and recovered by the base station, being marked as having been received via an IP tunnel, and being stored in a first downlink transmission data buffer, in accordance with an exemplary embodiment.

FIG. 16 is a drawing 1600 illustrating the system 1500 of FIG. 15 and further includes an exemplary IPsec tunnel 110 between the security server 106 of data center 104 and base station 1 102. The IPsec tunnel 110 conveys IP packet payload 1602, which includes user data sourced from UE 1 152 which is intended for UE 2 154, e.g., UE 1 152 and UE 2 154 are in an ongoing communications session. FIG. 16 further indicates that base station 1 102 generates an IPsec identifier 1604 with a value=1 and associates it with the received IP packet payload 1602 which was received via an IPsec tunnel. Based on the IPsec Identifier value equaling 1, the IP packet payload data is put into a IPsec data buffer (queue) 1602, e.g. by a MAC scheduler.

Figure 17:
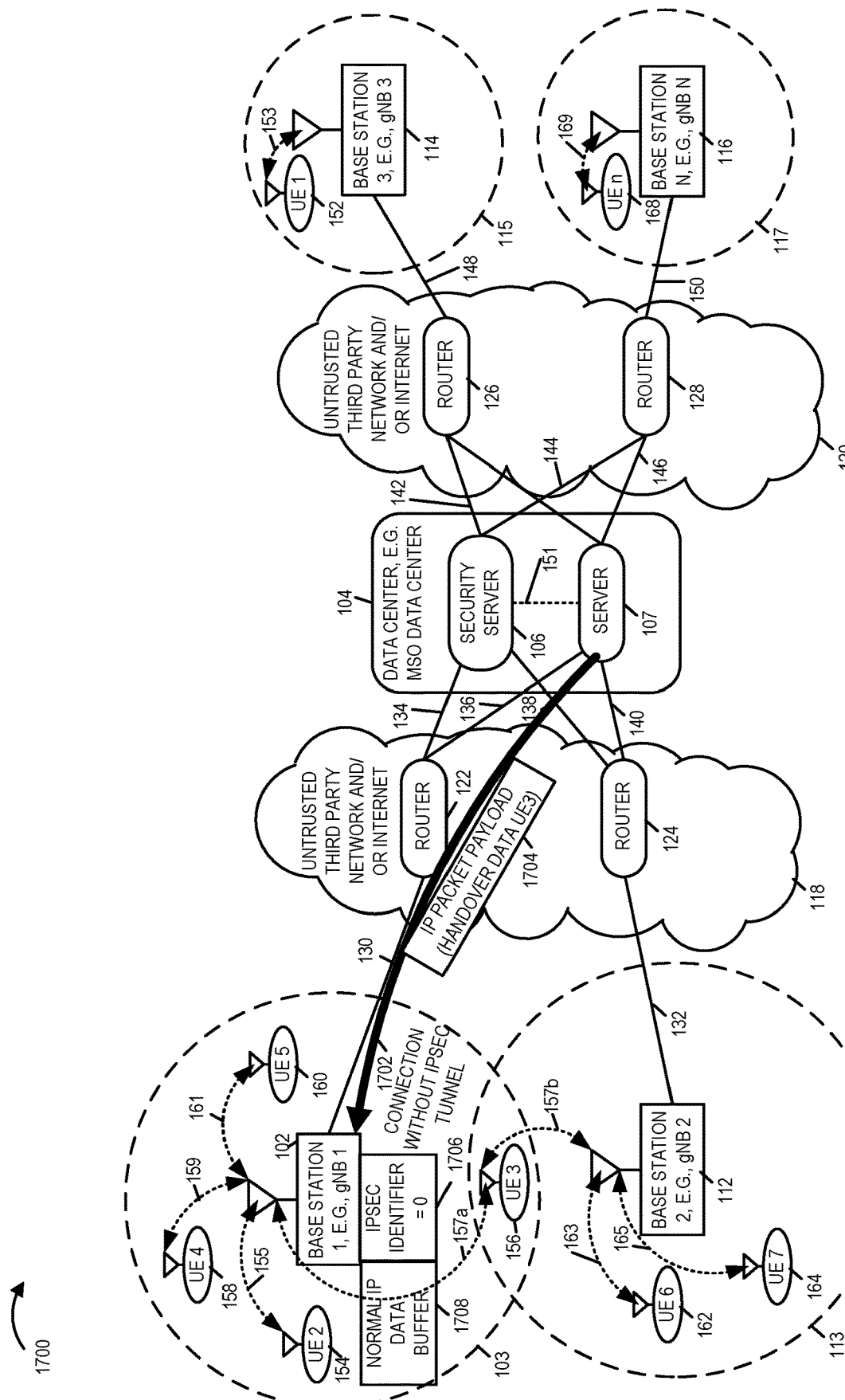
FIG. 17, which is a continuation of the example of FIG. 16, is a drawing illustrating an example of additional IP data (additional IP data packets) being communicated to a base station via a communications link that does not use an IPsec tunnel to communicate the additional IP data, being received by the base station, being marked as having been received from a communications link that is not using an IPsec tunnel to communicate the additional IP data, and being stored in a second downlink transmission data buffer, wherein data in the first downlink transmission buffer is prioritized over data in the second downlink transmission buffer in accordance with an exemplary embodiment.

FIG. 17 may be considered as a continuation of the example of FIG. 16. FIG. 17 is a drawing 1700 illustrating the system 1500 of FIG. 15 and further includes a connection (without an IPsec tunnel) 1702 between the server 107 of data center 104 and base station 1 102. The connection (without IPsec tunnel) 1702 conveys IP packet payload 1704, which includes control data regarding a handover of UE 3, which is intended to be communicated to UE 3 156, via downlink signals from base station 1 102 to UE 3 156. FIG. 17 further indicates that base station 1 102 generates an IPsec identifier 1706 with a value=0 and associates it with the received IP packet payload 1704 which was received via a communications link which did not use an IPsec tunnel. Based on the IPsec Identifier value equaling 0, the IP packet payload data is put into a normal IP data buffer (queue) 1708, e.g., by a MAC scheduler.

The MAC scheduler of the base station 102 makes downlink transmission scheduling decisions based on the current level of data in each of the downlink transmission buffers (IPsec data buffer 1602, normal IP data buffer 1708), a set of stored threshold limits, e.g., set of threshold limits 1346 and a method, e.g., in accordance with step 1128 of flowchart 1100 of FIG. 11 or step 1232 of flowchart 1200 of FIG. 12. The base station 102 then implements the scheduling decisions, e.g., generating and transmitting downlink signals to UEs, e.g., to UE 1 102 and/or UE 3 156.

Numbered List of Exemplary Method Embodiments

Method Embodiment 1

A method of operating a base station (e.g., a gNB) comprising: receiving (1204), at the base station, encrypted IP packet data via an IPsec tunnel with a security server of a communications service provider; decrypting (1206) the encrypted IP packet data received via the IPsec tunnel to recover first IP packets; associating (1208) an IPsec identifier with the first IP packets (e.g., appending an IPsec identifier to each of the first IP packets), said IPsec identifier being set to a value (e.g., 1) indicating that the first IP packets were received via an IPsec tunnel; receiving (1218), at the base station, additional data including additional IP packets (e.g., normal data such as control data sent between base stations and which is to be communicated to a UE as part of a handoff) via a communications link that does not use an IPsec tunnel; identifying (1212) first packets based on the value of the IPsec identifier associated with the first IP packets; storing (1216) the identified first packets in a first downlink transmission queue; and storing (1228) packets which were not received via an IPsec tunnel in a second downlink transmission queue, said additional IP packets being stored in said second downlink transmission queue.

Method Embodiment 2

The method of Method Embodiment 1, further comprising: operating (1232) a downlink transmission scheduler to schedule transmissions from said first and second downlink transmission queues, said scheduler giving (1234) a higher priority to data in the first downlink transmission queue than data in said second downlink transmission queue.

Method Embodiment 3

The method of Method Embodiment 1, wherein associating (1208) an IPsec identifier with the first IP packets includes appending (1210) an IPsec identifier with a value indicating that the first IP packets were received via an IPsec tunnel in front of an IP packet that was received via the IPsec tunnel.

Method Embodiment 4

The method of Method Embodiment 3, further comprising: stripping (1214) the IPsec identifier from the IP packets that were received via the IP sec tunnel prior to storing them in the first downlink transmission queue.

Method Embodiment 3A

The method of Method Embodiment 3, further comprising: associating (1220) another IPsec identifier with the additional IP packets (e.g., appending said another IPsec identifier to each of the additional IP packets), said another IPsec identifier being set to a value (e.g., 0) indicating that the additional IP packets were not received via an IP sec tunnel; and identifying (1224) the additional packets based on the value of the IPsec identifier associated with the additional IP packets.

Method Embodiment 3B

The method of Method Embodiment 3, wherein associating (1220) another IPsec identifier with the additional first IP packets includes appending (1222) an IPsec identifier, with a value indicating that the additional IP packets were not received via an IPsec tunnel, in front of an additional IP packet that was not received via an IPsec tunnel.

Method Embodiment 4A

The method of Method Embodiment 3A, further comprising: stripping (1226) the another IPsec identifier from the additional IP packets that were received via a communications link that does not use an IPsec tunnel prior to storing them in the second downlink transmission queue.

Method Embodiment 5

The method of Method Embodiment 2, further comprising: operating (1242) the downlink transmission scheduler to control the base station to transmit packets (e.g., in MAC frames) from the first and second downlink transmission queues to one or more UE devices.

Method Embodiment 6

The method of Method Embodiment 3, further comprising: wherein operating (1234) the downlink transmission scheduler to give a higher priority to data in the first downlink transmission queue than to data in said second downlink transmission queue includes operating (1236) the scheduler to schedule at least some data for transmission from the first downlink transmission queue when the first downlink transmission queue includes less data than said second downlink transmission queue (e.g., when the first downlink transmission queue includes data over a minimum threshold and the second downlink transmission queue includes data below an upper second downlink transmission queue threshold used to indicate the second downlink transmission queue (buffer) is full or nearly full).

Method Embodiment 7

The method of Method Embodiment 6, wherein operating (1234) the downlink transmission scheduler to give a higher priority to the first downlink transmission queue includes (1238) scheduling data to be transmitted from the second downlink transmission queue only when data in the first downlink transmission queue is below a minimum scheduling threshold or when the second downlink transmission queue includes data over an upper second downlink transmission queue threshold.

Method Embodiment 8

The method of Method Embodiment 7, wherein operating (1232) the downlink transmission scheduler to schedule transmissions from said first and second downlink transmission queues, further includes operating (1240) the downlink transmission scheduler to schedule transmission from said first and second downlink transmission queues on a round robin basis when said first downlink transmission queue has data exceeding an upper first downlink transmission queue threshold (indicating fullness of the first downlink transmission queue) and said second downlink transmission queue has data exceeding the upper second downlink transmission queue threshold (e.g., indicating fullness of the second downlink queue).

Method Embodiment 9

The method of Method Embodiment 1, wherein said first IP packets communicated via an IP Sec tunnel are user data packets being communicated between a first UE and a second UE, said second UE being in a first cell corresponding to said base station and the first UE being in a second cell corresponding to another base station (e.g., voice packets part of an end to end communications session between UEs located at two different base stations).

Method Embodiment 10

The method of Method Embodiment 9, wherein said additional data packets are control packets communicated from a neighbor base station (e.g. base station 2 112) (e.g., handoff related communications packets that are directed to a UE (e.g., UE 3 156) served by said base station (102) where the second base station 2 (112) from which the control packets are sent is physically adjacent to said base station and is the destination in a handoff in some cases).

Method Embodiment 11

The method of Method Embodiment 9, wherein said additional data packets are user data packets communicated between a third UE and a fourth UE attached to said base station and which do not traverse an IP sec tunnel.

Method Embodiment 12

The method of Method Embodiment 1, wherein associating the first IP packets is performed as an IP layer operation; and wherein said identifying the first IP packets is performed as a MAC layer operation.

Method Embodiment 13

The method of Method Embodiment 1, wherein said storing the identified first packets in the first downlink transmission queue is performed by a MAC layer packet scheduler that schedules the transmission of frames including one or more IP packet portions.

Numbered List of Exemplary Apparatus Embodiments

Apparatus Embodiment 1

A base station (e.g., a gNB) (102 or 1300) comprising: a receiver (e.g., network interface receiver 1316); and a processor (1302) configured to: operate the receiver (1316) to receive (1204), at the base station, encrypted IP packet data via an IPsec tunnel with a security server of a communications service provider; decrypt (1206) the encrypted IP packet data received via the IPsec tunnel to recover first IP packets; associate (1208) an IPsec identifier with the first IP packets (e.g., appending an IPsec identifier to each of the first IP packets), said IPsec identifier being set to a value (e.g., 1) indicating that the first IP packets were received via an IPsec tunnel; operate the receiver (1316) to receive (1218), at the base station, additional data including additional IP packets (e.g., normal data such as control data sent between base stations and which is to be communicated to a UE as part of a handoff) via a communications link that does not use an IPsec tunnel; identify (1212) first packets based on the value of the IPsec identifier associated with the first IP packets; store (1216) the identified first packets in a first downlink transmission queue (e.g., 1st transmission buffer 1342 in memory 1310); and store (1228) packets which were not received via an IPsec tunnel in a second downlink transmission queue (e.g., 2nd transmission buffer 1344 in memory 1310), said additional IP packets being stored in said second downlink transmission queue.

Apparatus Embodiment 2

The base station (1300) of Apparatus Embodiment 1, wherein said processor (1302) is further configured to: operate (1232) a downlink transmission scheduler to schedule transmissions from said first and second downlink transmission queues, said scheduler giving (1234) a higher priority to data in the first downlink transmission queue than to data in said second downlink transmission queue.

Apparatus Embodiment 3

The base station (1300) of Apparatus Embodiment 1, wherein said processor (1302) is configured to: append (1210) an IPsec identifier with a value indicating that the first IP packets were received via an IPsec tunnel in front of an IP packet that was received via the IPsec tunnel, as part of being configured to associate (1208) an IPsec identifier with the first IP packets.

Apparatus Embodiment 4

The base station (1300) of Apparatus Embodiment 3, wherein said processor (1302) is further configured to: strip (1214) the IPsec identifier from the IP packets that were received via the IPsec tunnel prior to storing them in the first downlink transmission queue.

Apparatus Embodiment 3A

The base station (1300) of Apparatus Embodiment 3, wherein said processor (1302) is further configured to: associate (1220) another IPsec identifier with the additional IP packets (e.g., appending said another IPsec identifier to each of the additional IP packets), said another IPsec identifier being set to a value (e.g., 0) indicating that the additional IP packets were not received via an IPsec tunnel; and identify (1224) the additional packets based on the value of the IPsec identifier associated with the additional IP packets.

Apparatus Embodiment 3B

The base station (1300) of Apparatus Embodiment 3, wherein said processor (1302) is configured to: append (1222) an IPsec identifier, with a value indicating that the additional IP packets were not received via an IPsec tunnel, in front of an additional IP packet that was not received via an IPsec tunnel.

Apparatus Embodiment 4A

The base station (1300) of Apparatus Embodiment 3A, wherein said processor (1302) is configured to: strip (1226) the another IPsec identifier from the additional IP packets that were received via a communications link that does not use an IPsec tunnel prior to storing them in the second downlink transmission queue.

Apparatus Embodiment 5

The base station (1300) of Apparatus Embodiment 2, wherein said processor is further configured to: operate (1242) the downlink transmission scheduler to control the base station to transmit (e.g., via wireless transmitter (1314)) packets (e.g., in MAC frames) from the first and second downlink transmission queues to one or more UE devices.

Apparatus Embodiment 6

The base station (1300) of Apparatus Embodiment 3, wherein said processor (1302) is configured to operate (1236) the scheduler to schedule at least some data for transmission from the first downlink transmission queue when the first downlink transmission queue includes less data than said second downlink transmission queue (e.g., when the first downlink transmission queue includes data over a minimum threshold and the second downlink transmission queue includes data below an upper second downlink transmission queue threshold used to indicate the second downlink transmission queue (buffer) is full or nearly full), as part of being configured to operate (1234) the downlink transmission scheduler to give a higher priority to data in the first downlink transmission queue than to data in said second downlink transmission queue.

Apparatus Embodiment 7

The base station (1300) of Apparatus Embodiment 6, wherein said processor (1302) is configured to operate the scheduler to schedule (1238) data to be transmitted from the second downlink transmission queue only when data in the first downlink transmission queue is below a minimum scheduling threshold or when the second downlink transmission queue includes data over an upper second downlink transmission queue threshold, as part of being configured to operate (1234) the downlink transmission scheduler to give a higher priority to the first downlink transmission queue.

Apparatus Embodiment 8

The base station (1300) of Apparatus Embodiment 7, wherein said processor (1302) is configured to operate (1240) the downlink transmission scheduler to schedule transmission from said first and second downlink transmission queues on a round robin basis when said first downlink transmission queue has data exceeding an upper first downlink transmission queue threshold (indicating fullness of the first downlink transmission queue) and said second downlink transmission queue has data exceeding the upper second downlink transmission queue threshold (e.g., indicating fullness of the second downlink queue), as part of being configured to operate (1232) the downlink transmission scheduler to schedule transmissions from said first and second downlink transmission queues.

Apparatus Embodiment 9

The base station (102 or 1300) of Apparatus Embodiment 1, wherein said first IP packets communicated via an IP Sec tunnel are user data packets being communicated between a first UE (e.g. UE 1 152) and a second UE (e.g., UE 2 154), said second UE being in a first cell (e.g. cell 103) corresponding to said base station (e.g., BS 1 102) and the first UE (e.g., UE 1 152) being in a second cell (e.g., cell 115) corresponding to another base station (e.g. BS 3 114) (e.g., voice packets part of an end to end communications session between UEs located at two different base stations).

Apparatus Embodiment 10

The base station (102 or 1300) of Apparatus Embodiment 9, wherein said additional data packets are control packets communicated from a neighbor base station (e.g. base station 2 112) (e.g., handoff related communications packets that are directed to a UE (e.g., UE 3 156) served by said base station (102) where the second base station 2 (112) from which the control packets are sent is physically adjacent to said base station (102) and is the target destination in a handoff in some cases).

Apparatus Embodiment 11

The base station (1300) of Apparatus Embodiment 9, wherein said additional data packets are user data packets communicated between a third UE (e.g. UE 4 158) and a fourth UE (e.g., UE 5 160) attached to said base station (e.g., BS 1 102) and which do not traverse an IP sec tunnel.

Apparatus Embodiment 12

The base station (1300) of Apparatus Embodiment 1, wherein associating the first IP packets is performed as an IP layer operation; and wherein said identifying the first IP packets is performed as a MAC layer operation.

Apparatus Embodiment 13

The base station (1300) of Apparatus Embodiment 1, wherein said storing the identified first packets in the first downlink transmission queue is performed by a MAC layer packet scheduler that schedules the transmission of frames including one or more IP packet portions.

Numbered List of Exemplary Non-Transitory Computer Readable Medium Embodiments

Non-Transitory Computer Readable Medium Embodiment 1

A non-transitory computer readable medium (1310) including computer executable instructions which when executed by a processor (1302) of a base station (1300) cause the base station (1300) to perform the steps of: receiving (1204), at the base station, encrypted IP packet data via an IPsec tunnel with a security server of a communications service provider; decrypting (1206) the encrypted IP packet data received via the IPsec tunnel to recover first IP packets; associating (1208) an IPsec identifier with the first IP packets (e.g., appending an IPsec identifier to each of the first IP packets), said IPsec identifier being set to a value (e.g., 1) indicating that the first IP packets were received via an IPsec tunnel; receiving (1218), at the base station, additional data including additional IP packets (e.g., normal data such as control data sent between base stations and which is to be communicated to a UE as part of a handoff) via a communications link that does not use an IPsec tunnel; identifying (1212) first packets based on the value of the IPsec identifier associated with the first IP packets; storing (1216) the identified first packets in a first downlink transmission queue; and storing (1228) packets which were not received via an IPsec tunnel in a second downlink transmission queue, said additional IP packets being stored in said second downlink transmission queue.

Various embodiments are directed to apparatus, e.g., user devices such as a user equipment (UE) device, mobile network operator (MNO) base stations (macro cell base stations and small cell base stations) such as a Evolved Node B (eNB), gNB or ng-eNB, mobile virtual network operator (MVNO) base stations such as Citizens Broadband Radio Service Devices (CBSDs), network nodes, MNO and MVNO HSS devices, relay devices, e.g. mobility management entities (MMEs), a Spectrum Access System (SAS), an Access and Mobility Management Function (AMF) device, servers, customer premises equipment devices, cable systems, network nodes, gateways, cable headend/hubsites, network monitoring node/servers, cluster controllers, cloud nodes, production nodes, cloud services servers and/or network equipment devices. Various embodiments are also directed to methods, e.g., method of controlling and/or operating user devices, base stations, e.g., eNB and CBSDs, gateways, servers (HSS server), MMEs, SAS, cable networks, cloud networks, nodes, servers, cloud service servers, customer premises equipment devices, controllers, network monitoring nodes/servers and/or cable or network equipment devices. Various embodiments are directed to communications network which are partners, e.g., a MVNO network and a MNO network. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements are steps are implemented using hardware circuitry.

In various embodiments nodes and/or elements described herein are implemented using one or more components to perform the steps corresponding to one or more methods, for example, message reception, message generation, signal generation, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a MVNO base station such as a CBRS base station, e.g., a CBSD, a device such as a cellular base station e.g., an eNB, a MNO HSS server, a MVNO HSS server, a UE device, a relay device, e.g. a MME, SAS, etc., said device including a processor configured to implement one, multiple or all of the steps of one or more methods of the invention. In some embodiments, the processor or processors, e.g., CPUs, of one or more devices, e.g., communications nodes such as e.g., a MVNO base station such as a CBRS base station, e.g. a CBSD, an device such as a cellular base station e.g., an eNB, a MNO HSS server, a MVNO HSS device server, a UE device, a relay device, e.g. a MME, a SAS, are configured to perform the steps of the methods described as being performed by the communications nodes, e.g., controllers. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., communications node such as e.g., a MVNO base station such as a CBRS base station, e.g. a CBSD, an device such as a cellular base station e.g., an eNB, a MNO HSS server, a MVNO HSS device server, a UE device, a relay device, e.g. a MME, includes a component corresponding to each of one or more of the steps of the various described methods performed by the device in which the processor is included. In some but not all embodiments a device, e.g., as e.g., a MVNO base station such as a CBRS base station, e.g., a CBSD, a device such as a cellular base station e.g., an eNB, a MNO HSS server, a MVNO HSS device server, a UE device, a relay device, e.g. a MME, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g., one or more steps described above.

Depending on the embodiment, the computer program product can, and sometimes does, include different code for each step to be performed. Thus, the computer program product may, and sometimes does, include code for each individual step of a method, e.g., a method of controlling a controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a MNVO base station, e.g., a CBSD, an MNO cellular base station, e.g., an eNB or a gNB, a HSS server, a UE device, a SAS or other device described in the present application. In some embodiments, components are implemented as hardware devices in such embodiments the components are hardware components. In other embodiments components may be implemented as software, e.g., a set of processor or computer executable instructions. Depending on the embodiment the components may be all hardware components, all software components, a combination of hardware and/or software or in some embodiments some components are hardware components while other components are software components.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of operating a base station comprising:
receiving, at the base station, encrypted IP packet data via an IPsec tunnel with a security server of a communications service provider;
decrypting the encrypted IP packet data received via the IPsec tunnel to recover first IP packets;
associating an IPsec identifier with the first IP packets, said IPsec identifier being set to a value indicating that the first IP packets were received via an IPsec tunnel;
receiving, at the base station, additional data including additional IP packets via a communications link that does not use an IPsec tunnel;
identifying first packets based on the value of the IPsec identifier associated with the first IP packets;
storing the identified first packets in a first downlink transmission queue; and
storing packets which were not received via an IPsec tunnel in a second downlink transmission queue, said additional IP packets being stored in said second downlink transmission queue.

2. The method of claim 1, further comprising:
operating a downlink transmission scheduler to schedule transmissions from said first and second downlink transmission queues, said scheduler giving a higher priority to data in the first downlink transmission queue than data in said second downlink transmission queue.

3. The method of claim 2, further comprising:
operating the downlink transmission scheduler to control the base station to transmit packets from the first and second downlink transmission queues to one or more UE devices.

4. The method of claim 1, wherein associating an IPsec identifier with the first IP packets includes appending an IPsec identifier with a value indicating that the first IP packets were received via an IPsec tunnel in front of an IP packet that was received via the IPsec tunnel.

5. The method of claim 4, further comprising:
stripping the IPsec identifier from the IP packets that were received via the IP sec tunnel prior to storing them in the first downlink transmission queue.

6. The method of claim 4, further comprising:
wherein operating the downlink transmission scheduler to give a higher priority to data in the first downlink transmission queue than to data in said second downlink transmission queue includes operating the scheduler to schedule at least some data for transmission from the first downlink transmission queue when the first downlink transmission queue includes less data than said second downlink transmission queue.

7. The method of claim 6, wherein operating the downlink transmission scheduler to give a higher priority to the first downlink transmission queue includes scheduling data to be transmitted from the second downlink transmission queue only when data in the first downlink transmission queue is below a minimum scheduling threshold or when the second downlink transmission queue includes data over an upper second downlink transmission queue threshold.

8. The method of claim 7, wherein operating the downlink transmission scheduler to schedule transmissions from said first and second downlink transmission queues, further includes operating the downlink transmission scheduler to schedule transmission from said first and second downlink transmission queues on a round robin basis when said first downlink transmission queue has data exceeding an upper first downlink transmission queue threshold and said second downlink transmission queue has data exceeding the upper second downlink transmission queue threshold.

9. The method of claim 1, wherein said first IP packets communicated via an IP Sec tunnel are user data packets being communicated between a first UE and a second UE, said second UE being in a first cell corresponding to said base station and the first UE being in a second cell corresponding to another base station.

10. The method of claim 9, wherein said additional data packets are control packets communicated from a neighbor base station.

11. The method of claim 9, wherein said additional data packets are user data packets communicated between a third UE and a fourth UE attached to said base station and which do not traverse an IP sec tunnel.

12. The method of claim 1, wherein associating the first IP packets is performed as an IP layer operation; and
wherein said identifying the first IP packets is performed as a MAC layer operation.

13. The method of claim 1, wherein said storing the identified first packets in the first downlink transmission queue is performed by a MAC layer packet scheduler that schedules the transmission of frames including one or more IP packet portions.

14. A base station comprising:
a receiver; and
a processor configured to:
operate the receiver to receive, at the base station, encrypted IP packet data via an IPsec tunnel with a security server of a communications service provider;
decrypt the encrypted IP packet data received via the IPsec tunnel to recover first IP packets;
associate an IPsec identifier with the first IP packets, said IPsec identifier being set to a value indicating that the first IP packets were received via an IPsec tunnel;
operate the receiver to receive, at the base station, additional data including additional IP packets via a communications link that does not use an IPsec tunnel;
identify first packets based on the value of the IPsec identifier associated with the first IP packets;
store the identified first packets in a first downlink transmission queue; and
store packets which were not received via an IPsec tunnel in a second downlink transmission queue, said additional IP packets being stored in said second downlink transmission queue.

15. The base station of claim 14, wherein said processor is further configured to:
operate a downlink transmission scheduler to schedule transmissions from said first and second downlink transmission queues, said scheduler giving a higher priority to data in the first downlink transmission queue than data in said second downlink transmission queue.

16. The base station of claim 15, wherein said processor is further configured to:
operate the downlink transmission scheduler to control the base station to transmit packets from the first and second downlink transmission queues to one or more UE devices.

17. The base station of claim 14, wherein said processor is configured to:
append an IPsec identifier with a value indicating that the first IP packets were received via an IPsec tunnel in front of an IP packet that was received via the IPsec tunnel, as part of being configured to associate an IPsec identifier with the first IP packets.

18. The base station of claim 17, wherein said processor is further configured to:
strip the IPsec identifier from the IP packets that were received via the IP sec tunnel prior to storing them in the first downlink transmission queue.

19. The base station of claim 17, wherein said processor is configured to operate the scheduler to schedule at least some data for transmission from the first downlink transmission queue when the first downlink transmission queue includes less data than said second downlink transmission queue, as part of being configured to operate the downlink transmission scheduler to give a higher priority to data in the first downlink transmission queue than to data in said second downlink transmission queue.

20. A non-transitory computer readable medium including computer executable instructions which when executed by a processor of a base station cause the base station to perform the steps of:
receiving, at the base station, encrypted IP packet data via an IPsec tunnel with a security server of a communications service provider;
decrypting the encrypted IP packet data received via the IPsec tunnel to recover first IP packets;
associating an IPsec identifier with the first IP packets, said IPsec identifier being set to a value indicating that the first IP packets were received via an IPsec tunnel;
receiving, at the base station, additional data including additional IP packets via a communications link that does not use an IPsec tunnel;
identifying first packets based on the value of the IPsec identifier associated with the first IP packets;
storing the identified first packets in a first downlink transmission queue; and
storing packets which were not received via an IPsec tunnel in a second downlink transmission queue, said additional IP packets being stored in said second downlink transmission queue.

* * * * *